United States Patent
Jeyashekar et al.

(10) Patent No.: US 12,524,508 B2
(45) Date of Patent: *Jan. 13, 2026

(54) PROMPT REFINEMENT TO IMPROVE ACCURACY OF OUTPUTS FROM MACHINE LEARNING MODELS

(71) Applicant: Citibank, N.A., New York, NY (US)

(72) Inventors: Nigil Satish Jeyashekar, Irving, TX (US); Jason Engelbrecht, London (GB); Zheyu Wang, Shanghai (CN); Haolin Jin, Shanghai (CN); Payal Jain, London (GB); Tariq Husayn Maonah, London (GB); Mariusz Saternus, Cracow (PL); Daniel Lewandowski, Cracow (PL); Biraj Krushna Rath, London (GB); Stuart Murray, London (GB); Philip Davies, London (GB); Sourabh Deb, Tampa, FL (US)

(73) Assignee: CITIBANK, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/188,116

(22) Filed: Apr. 24, 2025

(65) Prior Publication Data

US 2025/0322047 A1    Oct. 16, 2025

Related U.S. Application Data

(63) Continuation-in-part of application No. 18/951,120, filed on Nov. 18, 2024, which is a continuation of
(Continued)

(51) Int. Cl.
  *G06F 21/31*    (2013.01)
  *G06F 21/62*    (2013.01)
  *G06F 40/20*    (2020.01)

(52) U.S. Cl.
  CPC .......... *G06F 21/31* (2013.01); *G06F 21/6218* (2013.01); *G06F 40/20* (2020.01)

(58) Field of Classification Search
  CPC ....... G06F 21/31; G06F 40/20; G06F 21/6218
  See application file for complete search history.

(56) References Cited

U.S. PATENT DOCUMENTS 8,380,817 B2    2/2013    Okada
8,387,020 B1    2/2013    Maclachlan et al.
(Continued)

FOREIGN PATENT DOCUMENTS

CN    106502890 A    3/2017
WO    2022125803 A1    6/2022
WO    2024020416 A1    1/2024

OTHER PUBLICATIONS

AI Risk Management Framework NIST, retrieved on Jun. 17, 2024, https://www.nist.gov/itl/ai-risk-management-framework.
(Continued)

*Primary Examiner* — Yonas A Bayou
(74) *Attorney, Agent, or Firm* — Perkins Coie LLP

(57) ABSTRACT

Systems and methods for restructuring prompts in order to improve accuracy of outputs from models are disclosed herein. The system receives a user prompt indicating a request for data. The system generates a first and second output using a model, the first output generated based on the user prompt and the second output generated based on pseudocode. The system compares the first and second outputs to determine a match accuracy between the two outputs. If the two outputs sufficiently match, the system approves the user prompt. If the two outputs do not sufficiently match, the system initiates a prompt restructuring process, whereby the user prompt is restructured using pseudocode to improve the accuracy of the first output. The process is repeated iteratively until the restructured user
(Continued)

prompt generates a first output that sufficiently matches the second output generated based on the pseudocode.

20 Claims, 8 Drawing Sheets

Related U.S. Application Data application No. 18/633,293, filed on Apr. 11, 2024, now Pat. No. 12,147,513, application No. 19/188,116 is a continuation-in-part of application No. 18/907,414, filed on Oct. 4, 2024, which is a continuation of application No. 18/661,532, filed on May 10, 2024, now Pat. No. 12,111,747, which is a continuation-in-part of application No. 18/661,519, filed on May 10, 2024, now Pat. No. 12,106,205, which is a continuation-in-part of application No. 18/633,293, filed on Apr. 11, 2024, now Pat. No. 12,147,513, application No. 19/188,116, filed on Apr. 24, 2025 is a continuation-in-part of application No. 18/954,389, filed on Nov. 20, 2024, now Pat. No. 12,292,811, which is a continuation of application No. 18/812,913, filed on Aug. 22, 2024, which is a continuation-in-part of application No. 18/661,532, filed on May 10, 2024, now Pat. No. 12,111,747.

(56) References Cited

U.S. PATENT DOCUMENTS

| | | | |
|---|---|---|---|
| 9,842,045 B2 * | 12/2017 | Heorhiadi | G06F 11/3692 |
| 10,620,988 B2 | 4/2020 | Lauderdale et al. | |
| 10,764,150 B1 | 9/2020 | Hermoni et al. | |
| 10,949,337 B1 | 3/2021 | Yalla et al. | |
| 10,951,485 B1 | 3/2021 | Hermoni et al. | |
| 11,133,942 B1 | 9/2021 | Griffin | |
| 11,153,177 B1 | 10/2021 | Hermoni et al. | |
| 11,271,822 B1 | 3/2022 | Hermoni et al. | |
| 11,410,136 B2 | 8/2022 | Cook et al. | |
| 11,573,848 B2 | 2/2023 | Linck et al. | |
| 11,652,839 B1 | 5/2023 | Aloisio et al. | |
| 11,656,852 B2 | 5/2023 | Mazurskiy | |
| 11,681,811 B1 | 6/2023 | Dixit | |
| 11,683,333 B1 | 6/2023 | Dominessy et al. | |
| 11,706,241 B1 | 7/2023 | Cross et al. | |
| 11,720,686 B1 | 8/2023 | Cross et al. | |
| 11,734,418 B1 | 8/2023 | Epstein | |
| 11,750,717 B2 | 9/2023 | Walsh et al. | |
| 11,875,123 B1 * | 1/2024 | Ben David | G06N 3/092 |
| 11,875,130 B1 * | 1/2024 | Bosnjakovic | G06N 5/022 |
| 11,924,027 B1 * | 3/2024 | Mysore | G06F 9/5005 |
| 11,947,435 B2 | 4/2024 | Boulineau et al. | |
| 11,960,515 B1 * | 4/2024 | Pallakonda | G06F 40/30 |
| 11,983,806 B1 | 5/2024 | Ramesh et al. | |
| 11,990,139 B1 | 5/2024 | Sandrew | |
| 11,995,412 B1 * | 5/2024 | Mishra | G06F 16/735 |
| 12,001,463 B1 * | 6/2024 | Pallakonda | G06F 16/3344 |
| 12,026,599 B1 * | 7/2024 | Lewis, II | G06F 9/451 |
| 2003/0007178 A1 | 1/2003 | Jeyachandran et al. | |
| 2004/0098454 A1 | 5/2004 | Trapp et al. | |
| 2005/0204348 A1 | 9/2005 | Horning et al. | |
| 2006/0095918 A1 | 5/2006 | Hirose | |
| 2007/0067848 A1 | 3/2007 | Gustave et al. | |
| 2010/0275263 A1 | 10/2010 | Bennett et al. | |
| 2010/0313189 A1 | 12/2010 | Beretta et al. | |
| 2014/0137257 A1 | 5/2014 | Martinez et al. | |
| 2014/0258998 A1 | 9/2014 | Adl-tabatabai et al. | |
| 2017/0061132 A1 | 3/2017 | Hovor et al. | |
| 2017/0262164 A1 * | 9/2017 | Jain | G06F 3/04847 |
| 2017/0295197 A1 | 10/2017 | Parimi et al. | |
| 2018/0239903 A1 | 8/2018 | Bodin et al. | |
| 2018/0343114 A1 | 11/2018 | Ben-ari | |
| 2019/0188706 A1 | 6/2019 | Mccurtis | |
| 2019/0236661 A1 | 8/2019 | Hogg et al. | |
| 2019/0286816 A1 | 9/2019 | Fu | |
| 2020/0012493 A1 | 1/2020 | Sagy | |
| 2020/0043164 A1 | 2/2020 | Fuchs et al. | |
| 2020/0074470 A1 | 3/2020 | Deshpande et al. | |
| 2020/0153855 A1 | 5/2020 | Kirti et al. | |
| 2020/0259852 A1 | 8/2020 | Wolff et al. | |
| 2020/0309767 A1 | 10/2020 | Loo et al. | |
| 2020/0314191 A1 | 10/2020 | Madhavan et al. | |
| 2020/0334326 A1 | 10/2020 | Zhang et al. | |
| 2020/0349054 A1 | 11/2020 | Dai et al. | |
| 2021/0012486 A1 | 1/2021 | Huang et al. | |
| 2021/0049288 A1 | 2/2021 | Li | |
| 2021/0133182 A1 | 5/2021 | Anderson et al. | |
| 2021/0185094 A1 | 6/2021 | Waplington et al. | |
| 2021/0211431 A1 | 7/2021 | Albero et al. | |
| 2021/0264547 A1 | 8/2021 | Li | |
| 2021/0273957 A1 | 9/2021 | Boyer et al. | |
| 2021/0390465 A1 | 12/2021 | Werder et al. | |
| 2022/0114251 A1 | 4/2022 | Guim Bernat et al. | |
| 2022/0114399 A1 | 4/2022 | Castiglione et al. | |
| 2022/0147636 A1 | 5/2022 | Mahuli et al. | |
| 2022/0179906 A1 | 6/2022 | Desai et al. | |
| 2022/0198304 A1 | 6/2022 | Szczepanik et al. | |
| 2022/0286438 A1 | 9/2022 | Burke et al. | |
| 2022/0311681 A1 * | 9/2022 | Palladino | H04L 43/0852 |
| 2022/0318654 A1 | 10/2022 | Lin et al. | |
| 2022/0334818 A1 | 10/2022 | Mcfarland | |
| 2022/0358023 A1 | 11/2022 | Moser et al. | |
| 2022/0366140 A1 | 11/2022 | Saito et al. | |
| 2022/0398149 A1 | 12/2022 | Mcfarland et al. | |
| 2022/0414536 A1 | 12/2022 | M L et al. | |
| 2022/0417274 A1 | 12/2022 | Madanahalli et al. | |
| 2023/0019072 A1 | 1/2023 | Okunlola | |
| 2023/0032686 A1 | 2/2023 | Williams et al. | |
| 2023/0033317 A1 | 2/2023 | Lin et al. | |
| 2023/0035321 A1 | 2/2023 | Vijayaraghavan | |
| 2023/0039855 A1 | 2/2023 | Greene | |
| 2023/0052608 A1 | 2/2023 | Wattiau et al. | |
| 2023/0067128 A1 | 3/2023 | Engelberg et al. | |
| 2023/0071264 A1 | 3/2023 | Hakala et al. | |
| 2023/0076372 A1 | 3/2023 | Engelberg et al. | |
| 2023/0077527 A1 | 3/2023 | Sarkar | |
| 2023/0113621 A1 | 4/2023 | Griffin et al. | |
| 2023/0114719 A1 | 4/2023 | Thomas et al. | |
| 2023/0117962 A1 | 4/2023 | Kaimal et al. | |
| 2023/0118388 A1 | 4/2023 | Crabtree et al. | |
| 2023/0123314 A1 | 4/2023 | Crabtree et al. | |
| 2023/0132703 A1 | 5/2023 | Marsenic et al. | |
| 2023/0135660 A1 | 5/2023 | Chapman et al. | |
| 2023/0164158 A1 | 5/2023 | Fellows et al. | |
| 2023/0171282 A1 | 6/2023 | Bollinger | |
| 2023/0177441 A1 | 6/2023 | Durvasula et al. | |
| 2023/0177613 A1 | 6/2023 | Crabtree et al. | |
| 2023/0205888 A1 | 6/2023 | Tyagi et al. | |
| 2023/0205891 A1 | 6/2023 | Yellapragada et al. | |
| 2023/0208869 A1 | 6/2023 | Bisht et al. | |
| 2023/0208870 A1 | 6/2023 | Yellapragada et al. | |
| 2023/0208871 A1 | 6/2023 | Yellapragada et al. | |
| 2023/0229542 A1 | 7/2023 | Watkins et al. | |
| 2023/0252393 A1 | 8/2023 | Orzechowski et al. | |
| 2023/0259860 A1 | 8/2023 | Sarkar | |
| 2023/0269272 A1 | 8/2023 | Dambrot et al. | |
| 2024/0012734 A1 | 1/2024 | Lee et al. | |
| 2024/0020538 A1 * | 1/2024 | Socher | G06N 3/084 |
| 2024/0095077 A1 * | 3/2024 | Singh | G06F 9/5027 |
| 2024/0129345 A1 | 4/2024 | Kassam et al. | |
| 2024/0202442 A1 | 6/2024 | Saito et al. | |

OTHER PUBLICATIONS

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

(56) References Cited

OTHER PUBLICATIONS

Brown, D., et al., "The Great AI Challenge: We Test Five Top Bots on Useful, Everyday Skills," The Wall Street Journal, published May 25, 2024.

Cranium, Adopt & Accelerate AI Safely, retrieved on Nov. 7, 2024, from https://cranium.ai/.

Dong, Y., et al., "Building Guardrails for Large Language Models," https://ar5iv.labs.arxiv.org/html/2402.01822v1, published May 29, 2024, 20 pages.

Futurism, "Sam Altman Admits That OpenAI Doesn't Actually Understand How Its AI Works", Jun. 11, 2024, 4 pages, https://futurism.com/sam-altman-admits-openai-understand-ai.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "Routerbench: A Benchmark for Multi-LLM Routing System," arXiv:2403.12031v2 [cs.LG] Mar. 28, 2024, 16 pages.

International Search Report and Written Opinion received in Application No. PCT/US24/47571, dated Dec. 9, 2024, 10 pages.

International Search Report and Written Opinion Received received in Application No. PCT/US23/85942, dated Feb. 15, 2024, 6 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin, KPIs for gen AI: Why measuring your new AI is essential to its success, https://cloud.google.com/transform/kpis-for-gen-ai-why-measuring-your-new-ai-is-essential-to-its-success.

Anthrop/C, Mapping the Mind of a Large Language Model, https://www.anthropic.com/research/mapping-mind-language-model, May 21, 2024.

Claburn, Thomas, OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.

Marshall, Andrew, Threat Modeling AI/ML Systems and Dependencies, Nov. 2, 2022, 27 pages.

Roose, Kevin, "A.I. Has a Measurement Problem", The New York Times, Apr. 15, 2024, 5 pages.

Roose, Kevin, "A.I.'s Black Boxes Just Got a Little Less Mysterious", The New York Times, May 21, 2024, 5 pages.

Shah, Harshay, Decomposing and Editing Predictions by Modeling Model Computation, arXiv:2404.11534v1 [cs.LG] Apr. 17, 2024.

Shankar, Ram, "Failure Modes in Machine Learning", Nov. 2019, 14 pages.

\* cited by examiner

PROMPT REFINEMENT TO IMPROVE ACCURACY OF OUTPUTS FROM MACHINE LEARNING MODELS

CROSS-REFERENCE TO RELATED APPLICATIONS

This application is a continuation-in-part of U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYSTEMS OF THE SAME," which is a continuation of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," which is a continuation of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

This application is further a continuation-in-part of U.S. patent application Ser. No. 18/954,389, filed Nov. 20, 2024, entitled "DYNAMIC SYSTEM RESOURCE-SENSITIVE MODEL SOFTWARE AND HARDWARE SELECTION," which is a continuation of U.S. patent application Ser. No. 18/812,913, filed Aug. 22, 2024, entitled "DYNAMIC SYSTEM RESOURCE-SENSITIVE MODEL SOFTWARE AND HARDWARE SELECTION," which is a continuation-in-part of U.S. patent application Ser. No. 18/661,532, filed May 10, 2024, entitled "DYNAMIC INPUT-SENSITIVE VALIDATION OF MACHINE LEARNING MODEL OUTPUTS AND METHODS AND SYSTEMS OF THE SAME," which is a continuation-in-part of U.S. patent application Ser. No. 18/661,519, filed May 10, 2024, entitled "DYNAMIC, RESOURCE-SENSITIVE MODEL SELECTION AND OUTPUT GENERATION AND METHODS AND SYSTEMS OF THE SAME," which is a continuation-in-part of U.S. patent application Ser. No. 18/633,293, filed Apr. 11, 2024, entitled "DYNAMIC EVALUATION OF LANGUAGE MODEL PROMPTS FOR MODEL SELECTION AND OUTPUT VALIDATION AND METHODS AND SYSTEMS OF THE SAME."

The content of the foregoing applications is incorporated herein by reference in its entirety.

BACKGROUND

User prompts to models serve as the initial input or query that guides the model in producing relevant and contextually appropriate responses. These prompts can vary widely in complexity and specificity, depending on the user's needs and the capabilities of the model. In some implementations, the prompt significantly influences the quality and relevance of the output.

Figure 1:
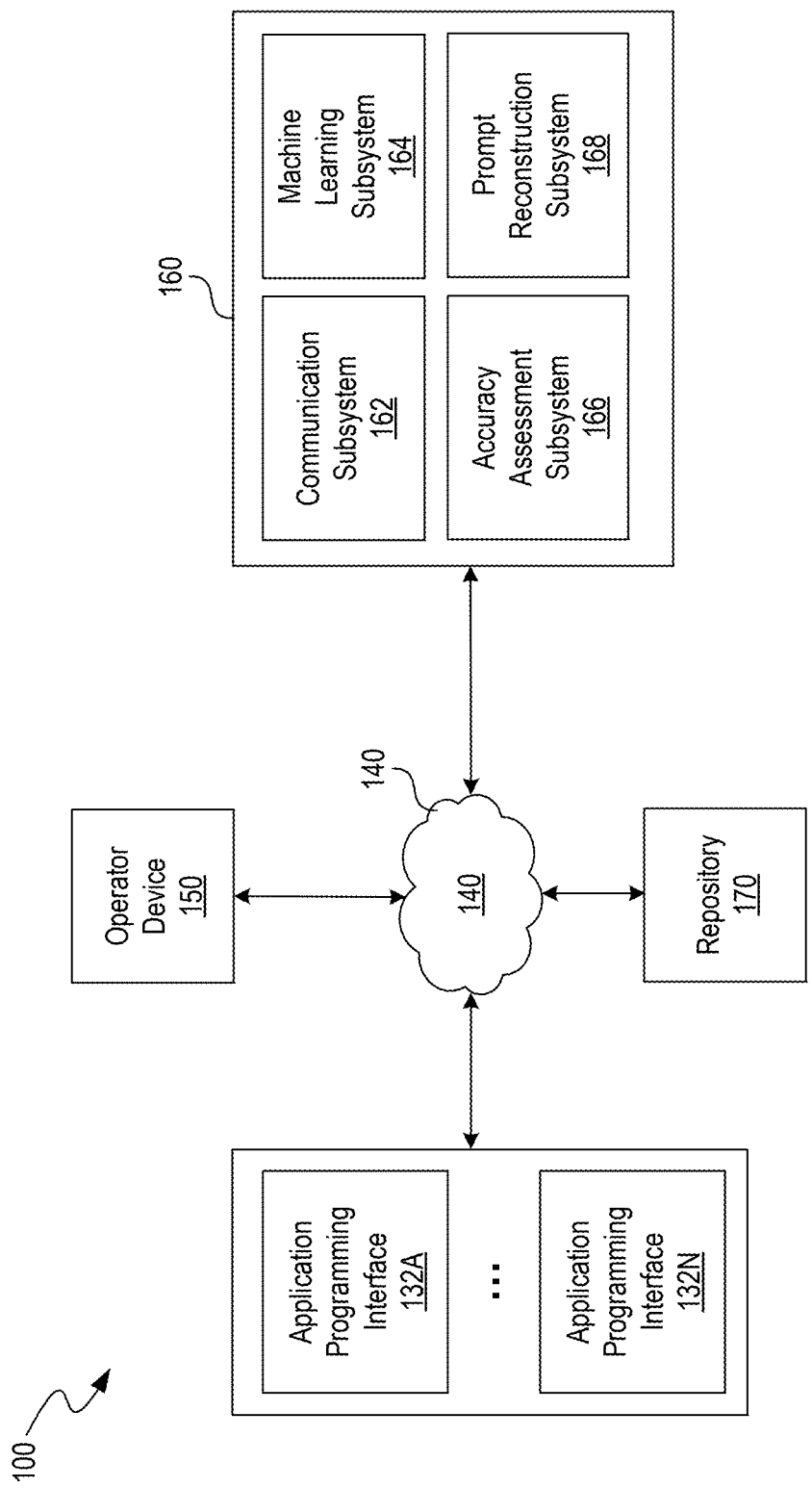
FIG. 1 shows an illustrative system for improving accuracy of results from machine learning models, in accordance with one or more implementations of this disclosure.

The technologies described herein will become more apparent to those skilled in the art from studying the Detailed Description in conjunction with the drawings. Implementations or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

As the reliance on machine learning models continues to grow, there are inherent risks associated with these models. Inaccurate outputs can affect outcomes and compromise safety and efficiency. Moreover, machine learning models (e.g., generative models) are increasingly being used in critical decision-making processes across various domains. Making decisions based on erroneous or misrepresented information included in model outputs can lead to significant consequences. For example, incorrect predictions or classifications can result in substantial losses, regulatory penalties, and damage to an organization's reputation.

Prompts for generative models can play a role in the accuracy and relevance of the outputs, and poorly constructed prompts can significantly contribute to the risks associated with these models. When prompts are vague, ambiguous, or lacking in specificity, they can lead to outputs that are inaccurate or misaligned with the user's intent. This can exacerbate the aforementioned risks. Especially in critical decision-making processes, the quality of the prompt is important for ensuring the quality of the outputs. If the prompt does not clearly define the parameters and context, the model can produce outputs that are misleading or incorrect. The ability to refine and enhance prompts can mitigate these risks and ensure that models produce accurate and reliable information.

Conventional systems lack a reliable method to assess model outputs and to perform a prompt refinement procedure based on this assessment. Once a model produces an output, current systems lack a systematic way to verify its accuracy or improve its quality by performing prompt refinement procedures. As a result, users of these systems are left to manually review and correct the outputs, which can be time-consuming and prone to human error. Moreover, without a structured approach to refining prompts, the quality of the outputs fails to improve over time. This can result in a continuous cycle of errors, where the same types of inaccuracies persist in the outputs, undermining the reliability and usefulness of these models.

This patent document discloses systems and methods designed to refine prompts for machine learning models. The system compares a set of model outputs based on a user prompt to a set of model outputs based on pseudocode. For example, if a user prompt asks for a summary a particular dataset, the system can generate an output based on the prompt and another output based on a structured pseudocode version of the prompt. The system can approve or deny the user prompt based on the comparison, and if the prompt is denied, the system can refine or restructure the prompt using the pseudocode. Ingesting refined prompts can enable generative models to generate more accurate and reliable information, thereby reducing the risk of errors.

In particular, a user prompt can be input to a generative model, which outputs a prompt-generated output. This output can be a combination of visual analytics, text-based analytics, and queries or programs. The parameters from the user prompt can be extracted and auto-populated into a data structure, such as a rule-based structured pseudocode (e.g., also referred to herein as a rule-based pseudocode or a structured pseudocode) that lists the parameters from the user prompt. The values of these parameters can be extracted, queried, or programmed to generate a pseudocode output that serves as the basis of comparison for the prompt-generated model output.

The result from the pseudocode output, which is also a combination of text-based analytics, visual analytics, or queries or programs can be compared to responses from the prompt-generated model output to determine a match accuracy. In particular, the comparison can be performed for each type of output (e.g., visual analytics, text-based analytics, and queries or programs) between the prompt-generated output and the pseudocode output. Based on the comparison, the system can approve or deny the prompt for use. If the prompt is denied, the system can perform prompt restructuring, which can involve incorporating the rule-based pseudocode into the user prompt. The process can repeat iteratively until the comparison yields a match accuracy that satisfies a threshold, at which point the restructured prompt can be approved for use.

FIG. 1 shows an illustrative system 100 for improving accuracy of results from machine learning models, in accordance with one or more implementations of this disclosure. For example, the system 100 can be used to assess model outputs and trigger prompt restructuring or refinement. In some implementations, the system 100 can utilize techniques such as generating outputs using different approaches and performing similarity analyses in order to assess outputs. For example, the system 100 can include an accuracy assessment subsystem 166 able to assess accuracy of model outputs and a prompt restructuring system 160 able to restructure prompts for generative models. The prompt restructuring system 160 can include software, hardware, or a combination of the two. For example, the prompt restructuring system 160 can be a physical server or a virtual server that is running on a physical computer system. In some implementations, the prompt restructuring system 160 can be configured on a user device (e.g., a laptop computer, a smartphone, a desktop computer, an electronic tablet, or another suitable user device) and configured to execute instructions for improving accuracy of results from machine learning models. In particular, the prompt restructuring system 160 can include several subsystems, each configured to perform one or more steps of the methods described herein, such as a communication subsystem 162, a machine learning subsystem 164, an accuracy assessment subsystem 166, and a prompt reconstruction subsystem 168.

As described herein, the prompt restructuring system 160 can obtain data related to improving accuracy of results from machine learning models. The prompt restructuring system 160 can retrieve data or sources of data from databases or data stores. The prompt restructuring system 160 may receive data via application programming interfaces (APIs) such as a set of APIs 130 (e.g., including API 132A, API 132N). As described herein, an API can be a set of rules and protocols that allows different software applications to communicate and interact with each other, facilitating the exchange of data, features, and functionalities. As described herein, a prompt restructuring system can be any system (e.g., computer, device, node, etc.) that is enabled to execute one or more tools for improving accuracy of results from machine learning models or enabled to execute tasks for which data can be passively collected. The prompt restructuring system 160 can be configured to receive the data via a communication network 140 at the communication subsystem 162. The communication network 140 can be a local area network (LAN), a wide area network (WAN; e.g., the internet), or a combination of the two. The communication subsystem 162 can include software components, hardware components, or a combination of both. For example, the communication subsystem 162 can include a network card (e.g., a wireless network card or a wired network card) that is associated with software to drive the card. The communication subsystem 162 can pass at least a portion of the data or a pointer to the data in memory to other subsystems, such as the machine learning subsystem 164, an accuracy assessment subsystem 166, and a prompt reconstruction subsystem 168.

According to some implementations, the prompt restructuring system 160 can obtain such data by generating one or more commands to execute prompt reconstruction operations. In some examples, the command(s) can specify a specific timeframe for obtaining the data (e.g., explicitly by identifying the timeframe via a start and an end time, or implicitly by requesting data from a current block of time). Additionally, the system 100 can include a repository 170, which can store historic data, stored data, machine learning model parameters, and system commands. In some implementations, the repository 170 can store preconfigured commands related to improving accuracy of results from machine learning models, which can be used by the prompt restructuring system 160 to manage prompt reconstruction dynamically. The repository 170 can also include metadata or tags associated with stored data, such as identifiers, policies, or patterns. The prompt restructuring system 160 can retrieve data from the repository 170 to refine its predictions, optimize outcomes, and refine prompts. Additionally, the repository 170 can store augmented datasets used to update the machine learning model based on newly collected data, ensuring adaptive and evolving predictions.

The system 100 can further include an operator device 150, which can receive alerts generated by the communication subsystem 162 when a prompt is rejected. The operator device 150 can be a desktop computer, mobile device, or other suitable user interface (UI) through which an operator can review system notifications and monitor outcomes, such as flagged or blocked outputs. The prompt restructuring system 160 can transmit natural language explanations to the operator device 150 to provide insight into prompt reconstruction and system responses.

Figure 2:
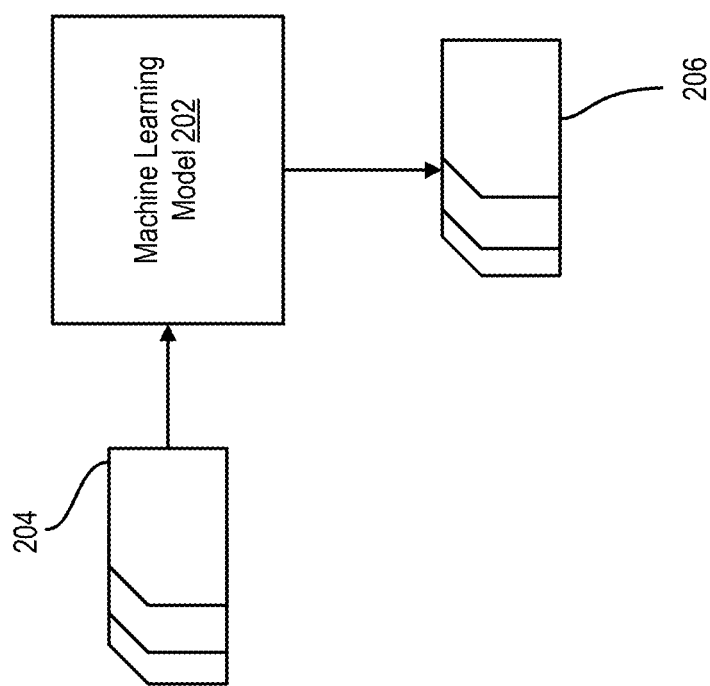
FIG. 2 illustrates an exemplary machine learning model, in accordance with one or more implementations of this disclosure.

FIG. 2 illustrates an exemplary machine learning model 202, in accordance with one or more implementations of this disclosure. The machine learning model 202 can be any type of machine learning model, including a neural network, a generative model, such as a large language model (LLM) or a small language model (SLM), or another type of machine learning model. According to some examples, the machine learning model can be any type of model. In some implementations, the machine learning model 202 can be trained to intake input 204, including input data and requests received. As a result of inputting the input 204 into the machine learning model 202, the machine learning model 202 can then output an output 206. As described herein, the input data can include data such as requests or prompts. In particular, the machine learning model 202 can receive a user prompt indicating a request for a report summarizing data over a time period. For example, the output 206 can include text-based analytics, visual analytics, queries or code, or other outputs based on the user prompt. Furthermore, as described, the machine learning model 202 can be configured to output a confidence interval or other metric for certainty regarding the outputs. The machine learning model 202 can be trained on a training dataset containing a plurality of user prompts, corresponding outputs, and labels, such as a degree of accuracy of an output that was identified by operators. For example, the machine learning model 202 is described in relation to FIG. 2 herein.

The output parameters can be fed back to the machine learning model 202 as input to train the machine learning model 202 (e.g., alone or in conjunction with user indications of the accuracy of outputs, labels associated with the inputs, or other reference feedback information). The machine learning model 202 can update its configurations (e.g., weights, biases, or other parameters) based on the assessment of its prediction and reference feedback information (e.g., user indication of accuracy, reference labels, or other information). Connection weights can be adjusted, for example, if the machine learning model 202 is a neural network to reconcile differences between the neural network's prediction and the reference feedback regarding conditions.

One or more neurons of the neural network can require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model can be trained to generate better predictions.

In some implementations, the machine learning model 202 can include an artificial neural network. In such implementations, the machine learning model 202 can include an input layer and one or more hidden layers. Each neural unit of the machine learning model 202 can be connected to one or more other neural units of the machine learning model 202. Such connections can be enforcing or inhibitory in their effect on the activation state of connected neural units. Each individual neural unit can have a summation function that combines the values of all of its inputs together. Each connection (or the neural unit itself) can have a threshold function that a signal must surpass before it propagates to other neural units. The machine learning model 202 can be self-learning or trained rather than explicitly programmed and can perform significantly better in certain areas of problem-solving as compared to computer programs that do not use machine learning. During training, an output layer of the machine learning model 202 can correspond to a classification of the machine learning model 202, and an input known to correspond to that classification can be input into an input layer of the machine learning model 202 during training. During testing, an input without a known classification can be input into the input layer, and a determined classification can be output.

The machine learning model 202 can include embedding layers in which each feature of a vector is converted into a dense vector representation. These dense vector representations for each feature can be pooled at one or more subsequent layers to convert the set of embedding vectors into a single vector. The machine learning model 202 can be structured as a factorization machine model. The machine learning model 202 can be a non-linear model or supervised learning model that can perform classification or regression. For example, the machine learning model 202 can be a general-purpose supervised learning algorithm that the prompt restructuring system 160 uses for both classification and regression tasks. Alternatively, the machine learning model 202 can include a Bayesian model configured to perform variational inference on the graph or vector.

Transformer for Neural Network

To assist in understanding the present disclosure, some concepts relevant to neural networks and machine learning are discussed herein. Generally, a neural network includes a number of computation units (sometimes referred to as "neurons"). Each neuron receives an input value and applies a function to the input to generate an output value. The function typically includes a parameter (also referred to as a "weight") whose value is learned through the process of training. A plurality of neurons can be organized into a neural network layer (or simply "layer"), and there can be multiple such layers in a neural network. The output of one layer can be provided as input to a subsequent layer. Thus, input to a neural network can be processed through a succession of layers until an output of the neural network is generated by a final layer. This is a simplistic discussion of neural networks, and there can be more complex neural network designs that include feedback connections, skip connections, or other such possible connections between neurons or layers, which are not discussed in detail here.

A deep neural network (DNN) is a type of neural network that has multiple layers or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and auto-regressive models, among others.

DNNs are often used as machine learning-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "machine learning-based model" or more simply "machine learning model" can be understood to refer to a DNN. Training a machine learning model refers to a process of learning the values of the parameters (or weights) of the neurons in the layers such that the machine learning model is able to model the target behavior to a desired degree of accuracy. Training typically requires the use of a training dataset, which is a set of data that is relevant to the target behavior of the machine learning model.

As an example, to train a machine learning model that is intended to model human language (also referred to as a "language model"), the training dataset can be a collection of text documents, referred to as a "text corpus" (or simply referred to as a "corpus"). The corpus can represent a language domain (e.g., a single language), a subject domain (e.g., scientific papers), or can encompass another domain or domains, be they larger or smaller than a single language or subject domain. For example, a relatively large, multilingual, and non-subject-specific corpus can be created by extracting text from online webpages or publicly available social media posts. Training data can be annotated with ground truth labels (e.g., each data entry in the training dataset can be paired with a label) or can be unlabeled.

Training a machine learning model generally involves inputting into a machine learning model (e.g., an untrained machine learning model) training data to be processed by the machine learning model, processing the training data using the machine learning model, collecting the output generated by the machine learning model (e.g., based on the inputted training data), and comparing the output to a desired set of target values. If the training data is labeled, the desired target values can be, e.g., the ground truth labels of the training data. If the training data is unlabeled, the desired target value can be a reconstructed (or otherwise processed) version of the corresponding machine learning model input (e.g., in the case of an autoencoder), or can be a measure of some target observable effect on the environment (e.g., in the case of a reinforcement learning agent). The parameters of the machine learning model are updated based on a difference between the generated output value and the desired target value. For example, if the value outputted by the machine learning model is excessively high, the parameters can be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the machine learning model is typically to minimize a loss function or maximize a reward function.

The training data can be a subset of a larger data set. For example, a data set can be split into three mutually exclusive subsets: a training set, a validation (or cross-validation) set, and a testing set. The three subsets of data can be used sequentially during machine learning model training. For example, the training set can be first used to train one or more machine learning models, e.g., each machine learning model having a particular architecture, having a particular training procedure, being describable by a set of model hyperparameters, or otherwise being varied from the other of the one or more machine learning models. The validation (or cross-validation) set can then be used as input data into the trained machine learning models to, e.g., measure the performance of the trained machine learning models or compare performance between them. Where hyperparameters are used, a new set of hyperparameters can be determined based on the measured performance of one or more of the trained machine learning models, and the first step of training (e.g., with the training set) can begin again on a different machine learning model described by the new set of determined hyperparameters. In this way, these steps can be repeated to produce a more performant trained machine learning model. Once such a trained machine learning model is obtained (e.g., after the hyperparameters have been adjusted to achieve a desired level of performance), a third step of collecting the output generated by the trained machine learning model applied to the third subset (the testing set) can begin. The output generated from the testing set can be compared with the corresponding desired target values to give a final assessment of the trained machine learning model's accuracy. Other segmentations of the larger data set or schemes for using the segments for training one or more machine learning models are possible.

Backpropagation is an algorithm for training a machine learning model. Backpropagation is used to adjust (e.g., update) the value of the parameters in the machine learning model with the goal of optimizing the objective function. For example, a defined loss function is calculated by forward propagation of an input to obtain an output of the machine learning model and a comparison of the output value with the target value. Backpropagation calculates a gradient of the loss function with respect to the parameters of the machine learning model, and a gradient algorithm (e.g., gradient descent) is used to update (e.g., "learn") the parameters to reduce the loss function. Backpropagation is performed iteratively so that the loss function is converged or minimized. Other techniques for learning the parameters of the machine learning model can be used. The process of updating (or learning) the parameters over many iterations is referred to as training. Training can be carried out iteratively until a convergence condition is met (e.g., a predefined maximum number of iterations has been performed or the value outputted by the machine learning model is sufficiently converged with the desired target value), after which the machine learning model is considered to be sufficiently trained. The values of the learned parameters can then be fixed and the machine learning model can be deployed to generate output in real-world applications (also referred to as "inference").

In some examples, a trained machine learning model can be fine-tuned, meaning that the values of the learned parameters can be adjusted slightly in order for the machine learning model to better model a specific task. Fine-tuning of a machine learning model typically involves further training the machine learning model on a number of data samples (which can be smaller in number/cardinality than those used to train the model initially) that closely target the specific task. For example, a machine learning model for generating natural language, e.g., for alerts to operators or commands that have been trained generically on publicly available text corpora can be, e.g., fine-tuned by further training using specific training samples. The specific training samples can be used to generate language in a certain style or in a certain format. For example, the machine learning model can be trained to generate a blog post having a particular style and structure with a given topic.

Some concepts in machine learning-based language models are now discussed. It can be noted that, while the term "language model" has been commonly used to refer to a machine learning-based language model, there could exist non-machine learning language models. In the present disclosure, the term "language model" can refer to a machine learning-based language model (e.g., a language model that is implemented using a neural network or other machine learning architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model can contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistants).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure can be applicable to any machine learning-based language model, including language models based on other neural network architectures such as RNN-based language models.

Figure 3:
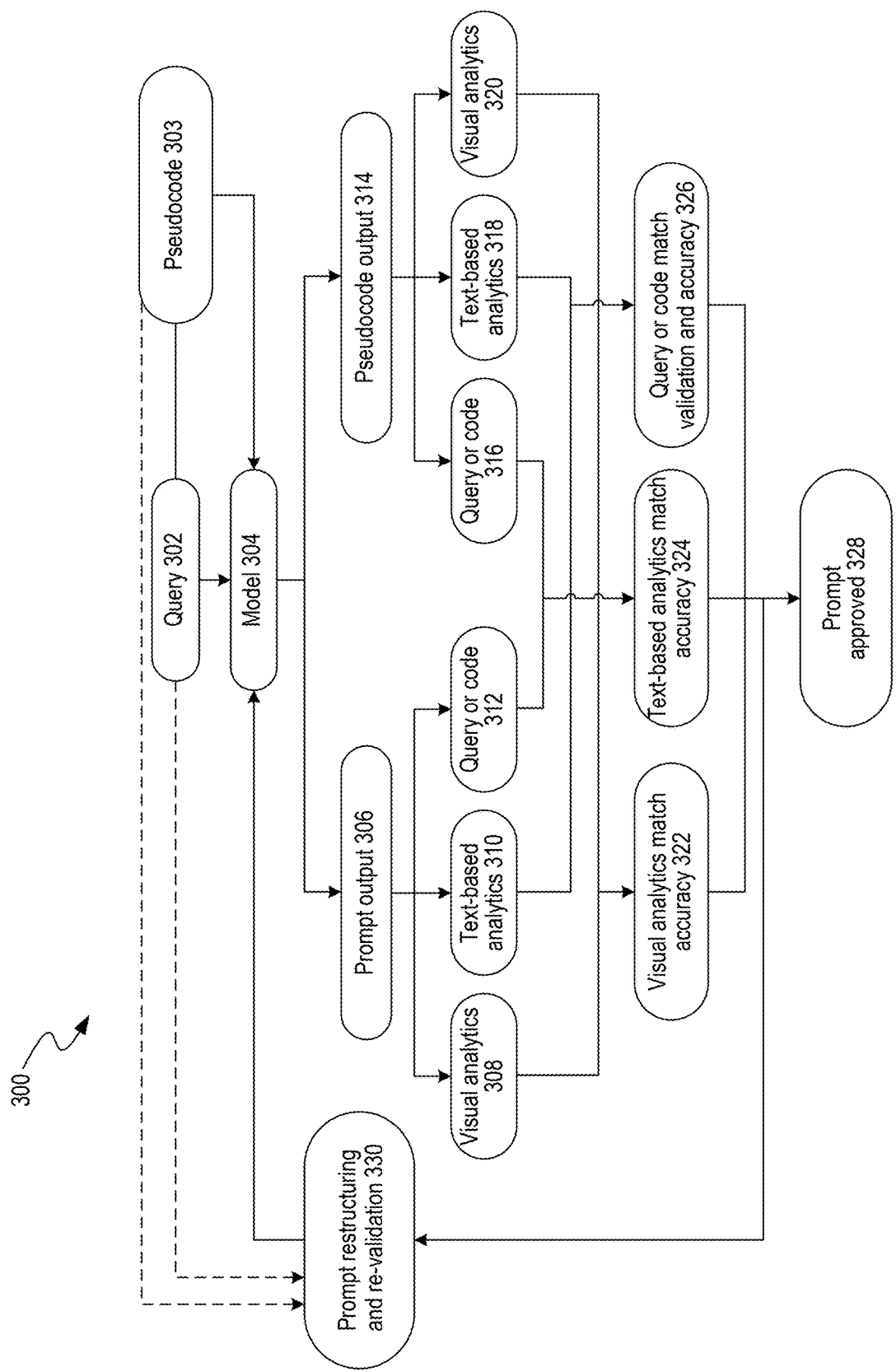
FIG. 3 illustrates a flow for improving accuracy of results from machine learning models, in accordance with one or more implementations of this disclosure.

FIG. 3 illustrates a flow 300 for improving accuracy of results from machine learning models, in accordance with one or more implementations of this disclosure. As shown in FIG. 3, the flow 300 can include a query 302, which is input into a model 304. In particular, the prompt restructuring system can receive a query (e.g., a user prompt) indicating a request for data over a time period. As an illustrative example, the query 302 can include "Show the trend in the number of transactions for Firm A in New York for 2024." In some implementations, the user prompt requests a report summarizing the data over a time period. For example, the user prompt can request a type of report or summary or can specify certain formats for the outputs. The prompt restructuring system can accommodate various user preferences by allowing customization of the report format, such as including specific data visualizations like graphs or charts, or focusing on particular metrics or key performance indicators (KPIs).

The prompt restructuring system can generate a first output by inputting, into a model, the user prompt to cause the model to generate the first output based on the user prompt. In particular, the prompt restructuring system can input the user prompt into a model (e.g., machine learning model 202, as shown in FIG. 2, or the model 304, as shown in FIG. 3). Inputting the prompt into the model can cause the model to generate an output based on the user prompt (e.g., prompt output 306, as shown in FIG. 3). The first output can include a first plurality of text-based analytics, a first plurality of visual analytics, and a first plurality of queries or code based on the user prompt. For example, the model can produce a detailed report that includes textual summaries of transaction trends, statistical analyses, and key insights derived from the data. Additionally, the first output can feature visual elements such as graphs, charts, and heatmaps that illustrate the trends and patterns in the data over the specified time period.

Figure 4:
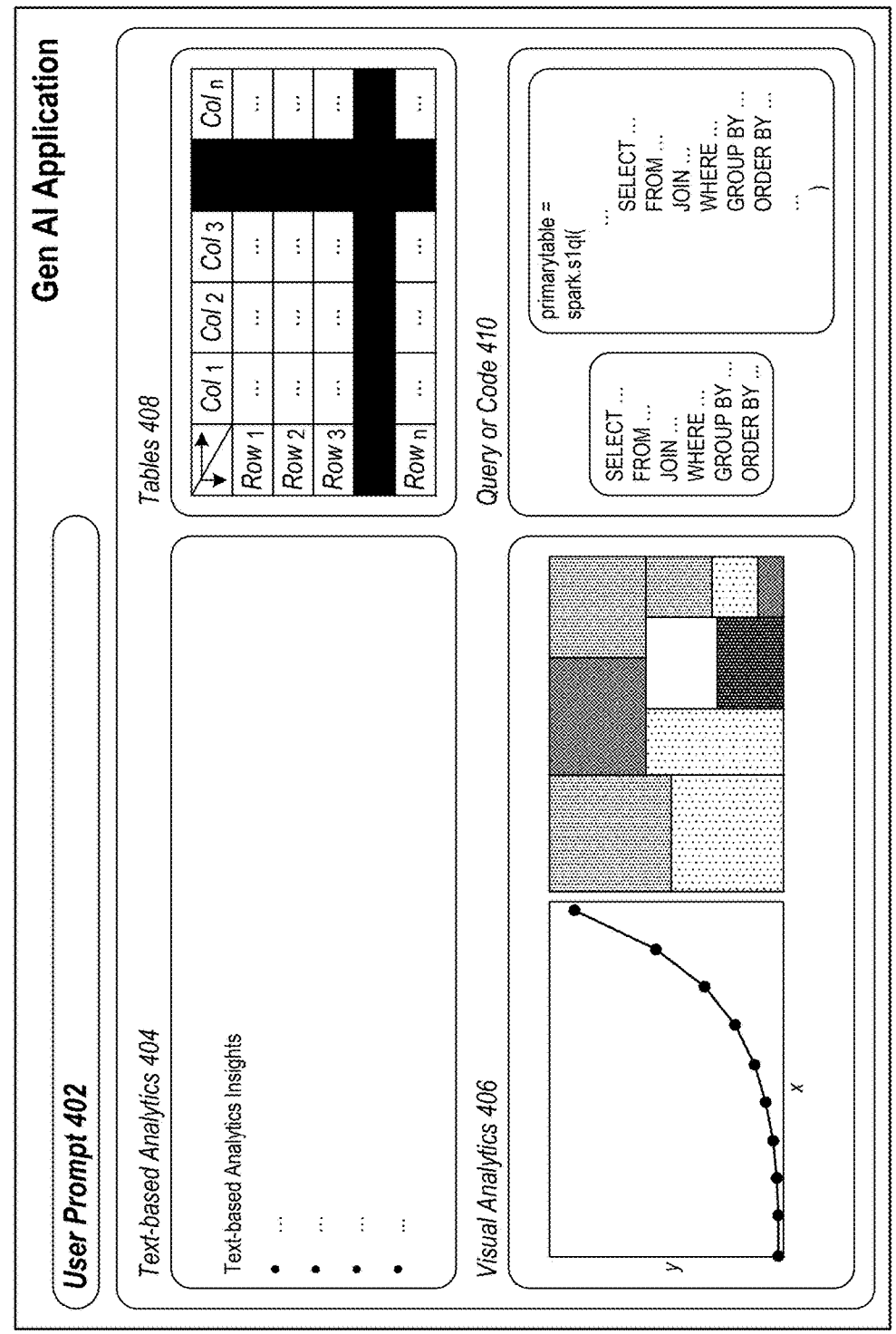
FIG. 4 illustrates a user interface for improving accuracy of results from machine learning models, in accordance with one or more implementations of this disclosure.

FIG. 4 illustrates a user interface (UI) 400 for improving accuracy of results from machine learning models, in accordance with one or more implementations of this disclosure. As shown in FIG. 4, the UI 400 can include a field for a user to input a user prompt 402 (e.g., the query 302, as shown in FIG. 3), a portion of the UI dedicated to displaying text-based analytics 404, portions of the UI dedicated to displaying visual analytics 406, tables 408, and query or code 410. In some implementations, the portions of the prompt output 306, as shown in FIG. 3, correspond to the portions of the UI 400. For example, the visual analytics 308, as shown in FIG. 3, correspond to the visual analytics 406, the tables 408, the text-based analytics 310, as shown in FIG. 3, correspond to the text-based analytics 404, and the query or code 312, as shown in FIG. 3, corresponds to the query or code 410. In some implementations, the UI 400 includes other information or other configurations.

The prompt restructuring system can generate a second output that serves as a basis of comparison with the first output. For example, the second output can be based on a pseudocode prompt to the model. The prompt restructuring system can retrieve, from a database associated with the data requested in the user prompt, a rule-based pseudocode. Pseudocode can structure and describe the steps and logic needed to guide a model. Pseudocode can use plain language and structured formatting to outline desired instructions and parameters without the constraints of specific programming syntax. In some implementations, pseudocode can assist in defining explicit parameters, incorporating necessary context, and specifying clear instructions for models. A rule-based pseudocode can include a structured and systematic approach to defining a set of rules and conditions that guide the modification or restructuring of a prompt or query. A rule-based pseudocode can include logical steps and criteria that the prompt restructuring system can rely upon.

As an illustrative example, the pseudocode can stipulate the following: 1. Ensure the firm name is clearly specified; 2. Include the location explicitly; 3. Specify the time frame in a standard format; and 4. Clarify the type of trend analysis (e.g., monthly, quarterly). In some implementations, the pseudocode includes the following rules: 1. Verify that all necessary parameters are included (who, what, where, when, how); 2. Ensure the prompt specifies the data visualization type (e.g., line chart, bar graph); and 3. Confirm the time frame is clear and unambiguous. In some implementations, other pseudocode can be used. By using pseudocode, the system can apply specific guidelines to generate a pseudocode prompt.

In some implementations, pseudocode can outline complex data structures and operations, including the use of tables, Python dictionaries, and JSON files. For example, pseudocode can describe the structure and relationships between rows and columns in a table, specifying how data should be organized and accessed. A table representing retail data can include columns for date, product, quantity, and price, with pseudocode detailing how to iterate through rows to calculate total sales. In some implementations, Python dictionaries can be represented in pseudocode to illustrate key-value pairs and nested structures. For example, a dictionary storing user information can include keys for user ID, name, and contact details, with pseudocode demonstrating how to retrieve and update values. JSON files, which can be used for data interchange, can also be described in pseudocode to show the hierarchical organization of data. Pseudocode can outline the process of parsing a JSON file, extracting specific fields, and converting the data into a usable format. By incorporating these elements, pseudocode can present a clear and structured way to represent complex data.

The prompt restructuring system can generate a pseudocode prompt based on the rule-based pseudocode and the data requested in the user prompt. Generating the pseudocode prompt can include populating pseudocode rules with key parameters from the user prompt (e.g., as discussed in relation to FIG. 5). The prompt restructuring system can extract critical parameters such as the entity (e.g., Firm A), the location (e.g., New York), the time frame (e.g., 2024), and the type of analysis (e.g., trend in the number of transactions). These parameters can then be systematically integrated into the pseudocode rules to create a comprehensive and precise prompt. For example, the rule can specify that the time frame should be explicit, resulting in a pseudocode prompt such as "Display the monthly trend in the number of transactions for Firm A located in New York City for the year 2024." In some implementations, the prompt restructuring system applies a combination of pseudocode prompt to the original user prompt to generate the pseudocode prompt. As an example, a rule can require granularity in the type of transactions, resulting in the following pseudocode prompt: "Show the monthly trend in the number of retail transactions for Firm A located in New York City for the year 2024." Another rule can involve specifying the type of data visualization, leading to a pseudocode prompt such as "Generate a line chart showing the monthly trend in the number of retail transactions for Firm A located in New York City for the year 2024." By systematically applying these rules, the prompt restructuring system can create a more precise and effective pseudocode prompt that accurately reflects the user's request and enhances the quality of the generated outputs.

The prompt restructuring system can input, into the model, the pseudocode prompt. For example, as shown in FIG. 3, pseudocode 303 feeds into the model 304. This causes the model to generate the second output (e.g., pseudocode output 314) based on the pseudocode prompt. The second output can include a second plurality of text-based analytics, a second plurality of visual analytics, and a second plurality of queries or code.

In some implementations, the prompt restructuring system can perform a comparison of the first output and the second output. In some implementations, the prompt restructuring system can perform the comparison to determine a match accuracy. For example, the prompt restructuring system can compare the first plurality of text-based analytics (e.g., text-based analytics 310, as shown in FIG. 3) with the second plurality of text-based analytics (e.g., text-based analytics 318), the first plurality of visual analytics (e.g., visual analytics 308) with the second plurality of visual analytics (e.g., visual analytics 320), and the first plurality of queries (e.g., query or code 312) with the second plurality of queries (e.g., query or code 316). In some implementations, the prompt restructuring system compares individual portions from the first output and the second output, such as certain portions of the visual analytics or certain keywords from the text-based analytics. In some implementations, other comparisons are performed.

Each pair of elements can be compared using exact matching or similarity metrics. Exact matching checks if the elements are identical, while similarity metrics allow for a degree of variation, accounting for minor differences in spelling or phrasing. One-to-one matching can be highly effective in scenarios where the sequence and position of elements are crucial, as it preserves the structural integrity of the data. However, it can be less flexible in handling cases where elements can be reordered or where there are insertions or deletions. Similarity metrics can include cosine similarity, Jaccard similarity, or Levenshtein distance. These metrics quantify the degree of overlap or similarity between the two sets of keywords, providing a measure of match accuracy. For example, cosine similarity measures the cosine of the angle between two non-zero vectors of an inner product space, which in this case are the keyword vectors. A cosine similarity score close to 1 indicates a high degree of similarity, while a score close to 0 indicates low similarity. Jaccard similarity measures the size of the intersection divided by the size of the union of the two sets of keywords, providing a ratio that reflects the overlap between the sets. Levenshtein distance calculates the minimum number of single-character edits (insertions, deletions, or substitutions) required to change one word into the other, providing a measure of the difference between the keywords.

In some implementations, to perform the comparison, the prompt restructuring system can compare a first plurality of keywords extracted from the text-based analytics of the first output and a second plurality of keywords extracted from the text-based analytics of the second output. These keywords can represent the most significant terms and concepts within the text-based analytics, providing a basis for comparison. The prompt restructuring system can apply various text analysis techniques to refine the keyword extraction process. This can include removing stop words (common words that do not carry significant meaning, such as "and," "the," "is"), stemming or lemmatizing words to their root forms (e.g., "running" to "run"), and identifying named entities (e.g., company names, locations, dates). By refining the keywords in this manner, the prompt restructuring system ensures that the comparison focuses on the most relevant and meaningful terms. Once the keywords are extracted and refined, the prompt restructuring system can perform a similarity analysis to compare the first plurality of keywords (e.g., from the first output) with the second plurality of keywords (e.g., from the second output). This can involve calculating various similarity metrics, such as cosine similarity, Jaccard similarity, or Levenshtein distance, as discussed above.

In some implementations, the prompt restructuring system compares tables generated for the first and second outputs. In some implementations, the tables are generated by the model. In some implementations, the tables are generated by extracting data points from graphs or charts generated by the model. For example, the prompt restructuring system can form a table from a graph by extracting data points from the graph and organizing them into two columns (e.g., x and y columns). Each data point from the graph is placed into the corresponding column, creating a structured representation of the graph's data. Once the tables for both the first and second outputs are formed, the prompt restructuring system can extract values from each table for comparison. This comparison involves checking for discrepancies or matches between the corresponding x and y values in the two tables.

In some implementations, the prompt restructuring system compares queries generated for the first and second outputs. For example, when comparing query to query between the first and second outputs, the prompt restructuring system can analyze the structure and content of, for example, SQL queries to determine whether they produce equivalent results. When performing database to database comparisons between the first and second outputs, the prompt restructuring system can evaluate the schema, data integrity, and relationships between different databases to ensure consistency and accuracy. Additionally, the system can map table name to table name between the first and second outputs, ensuring that corresponding tables in different databases or within the same database are correctly aligned and contain the expected data. Finally, column to column comparisons between the first and second outputs can be performed to verify that specific columns in different tables or databases hold equivalent data types, constraints, and values.

In some implementations, the prompt restructuring system compares elements of the first and second outputs according to a ranking. For example, this can involve determining a ranking of categories from the first and second outputs based on a measure of importance for each category. The prompt restructuring system can dynamically rank the categories, for example, using an LLM or other machine learning model to assess the importance of the categories. For example, the prompt restructuring system can feed the categories into an LLM with a prompt instructing the LLM to rank the categories in order of importance for accuracy. These categories can include the text-based analytics, visual analytics, and queries. For example, in some implementations, the text-based analytics are most important based on the user prompt, the subject matter, the context, or other factors. In some implementations, the visual analytics are most important based on any of these factors, and so on. In some implementations, the queries are most important based on any of these factors. The prompt restructuring system can dynamically rank the categories based on the circumstances for each user prompt. The comparison between the first and second outputs can then be performed according to this ranking.

For example, once the ranking of categories is established, the prompt restructuring system can compare a higher-ranked category between the first output and the second output. The categories in both outputs can include at least one higher-ranked category and one lower-ranked category. In some implementations, the higher-ranked category can be the highest-ranked category out of the three: text-based analytics, visual analytics, and queries. As an illustrative example, the ranking of importance from highest to lowest is: visual analytics, text-based analytics, then queries. If it is determined that the higher-ranked category does not match between the first and second outputs, a restructured prompt can be generated. For example, if the higher-ranked category (e.g., visual analytics) does not match, the prompt restructuring system can initiate the prompt reconstruction process without comparing any lower-ranked categories.

In some implementations, if it is determined that the higher-ranked category matches between the first and second outputs, the user prompt can be approved. For example, the prompt restructuring system can determine that, based on the higher-ranked category (e.g., visual analytics) matching between the first and second outputs, the prompt restructuring system can approve the user prompt. In some implementations, the prompt restructuring system determines that another category within the ranking must match in order to approve the user prompt. For example, the prompt restructuring system can proceed to the second-highest-ranked category (e.g., text-based analytics) to perform a comparison between the first and second outputs. In some implementations, if it is determined that the two highest-ranked categories match between the first and second outputs, the user prompt can be approved. For example, the prompt restructuring system can determine that, based on the two highest-ranked categories (e.g., visual analytics and text-based analytics) matching between the first and second outputs, the prompt restructuring system can approve the user prompt. This approval can indicate that the outputs are consistent in terms of the most important categories, thereby validating the initial user prompt. This process can ensure that the analysis or query is accurate and reliable, based on the alignment of the higher-ranked categories across different outputs.

In some implementations, the prompt restructuring system can apply different similarity analyses to categories with different rankings. For example, the prompt restructuring system can require that the highest-ranked category (e.g., visual analytics) be an exact match while a lower-ranked category (e.g., text-based analytics) requires substantial semantic similarity to be deemed a match. This approach can allow the system to prioritize the accuracy and precision of the most important categories, ensuring that the highest-ranked category meets the strictest criteria for matching. Meanwhile, for lower-ranked categories, the system can be more flexible, allowing for variations in wording or expression as long as the overall meaning remains consistent.

By applying any of these similarity metrics to compare the first and second outputs, the prompt restructuring system can determine the match accuracy between the first and second outputs. In some implementations, the match accuracy is determined for each pair of elements that is compared between the first and second outputs. As an example, the comparison between the first plurality of text-based analytics (e.g., text-based analytics 310, as shown in FIG. 3) and the second plurality of text-based analytics (e.g., text-based analytics 318) can yield a text-based analytics match accuracy 324. The comparison between the first plurality of visual analytics (e.g., visual analytics 308) and the second plurality of visual analytics (e.g., visual analytics 320) can yield a visual analytics match accuracy 322. The comparison between the first plurality of queries (e.g., query or code 312) and the second plurality of queries (e.g., query or code 316) can yield a query or code match validation and accuracy 326.

A high match accuracy indicates that the first output closely aligns with the second output, suggesting that the information is consistent and reliable. Conversely, a low match accuracy can indicate discrepancies or inconsistencies, prompting further investigation or prompt reconstruction. In some implementations, the prompt restructuring system determines whether the match accuracy satisfies an accuracy threshold. For example, if the match accuracy exceeds a predefined threshold, such as 90%, the prompt restructuring system can consider the outputs to be sufficiently similar and consistent. However, if the match accuracy falls below this threshold, the system can initiate a prompt reconstruction procedure (e.g., prompt restructuring and re-validation 330, as shown in FIG. 3). This threshold-based approach ensures that only outputs meeting a certain standard of similarity are accepted, thereby maintaining the quality and reliability of the generated information.

In some implementations, the prompt restructuring system can apply different accuracy thresholds to different categories of the first and second outputs. For example, the prompt restructuring system can compare the match accuracy of a higher-ranked category (e.g., visual analytics match accuracy 322, as shown in FIG. 3) to a higher accuracy threshold than the threshold to which lower-ranked categories are compared. This approach can allow the system to prioritize the accuracy and precision of the most important categories, ensuring that the highest-ranked category meets the strictest criteria for matching. Meanwhile, for lower-ranked categories, the system can apply a lower accuracy threshold. This can enable the prompt restructuring system to approve user prompts for which the higher-ranked categories are highly accurate and the lower-ranked categories are sufficiently accurate. In some implementations, other methods of applying accuracy thresholds to various categories can be used.

The prompt restructuring system can determine whether the match accuracy for one or more categories satisfies one or more accuracy thresholds. Based on the match accuracy satisfying the required accuracy threshold, the prompt restructuring system can approve the user prompt (e.g., prompt approved 328, as shown in FIG. 3). When the system evaluates the outputs and determines that the match accuracy meets or exceeds the predefined accuracy threshold, it indicates that the outputs are sufficiently aligned and consistent with the user's intent. This approval process can serve as a validation step, confirming that the user prompt has successfully generated outputs that meet the required standards of accuracy and relevance. By approving the user prompt, the prompt restructuring system can signal that no further modifications or refinements are necessary, and the prompt can be used for subsequent analyses or queries. This approval mechanism can ensure that only prompts that produce high-quality and reliable results are accepted, thereby maintaining the integrity and effectiveness of the prompt restructuring system.

Based on the match accuracy failing to satisfy the accuracy threshold, the prompt restructuring system can generate a restructured prompt using the user prompt and rule-based pseudocode. For example, when the system detects that the match accuracy between the outputs does not meet the predefined accuracy threshold, it can initiate a process to refine the user prompt. This refinement can involve leveraging rule-based pseudocode, which can provide a structured and systematic approach to modifying the prompt. The pseudocode can outline specific rules and conditions that guide the restructuring process, ensuring that the new prompt addresses the discrepancies identified in the initial analysis. By applying these rules, the system can create a more precise and targeted prompt that is likely to yield outputs with higher match accuracy. This method can enhance the overall effectiveness of the prompt restructuring system, enabling it to produce more accurate and reliable results by systematically addressing and correcting any prompts in need of restructuring.

In some implementations, the prompt restructuring system generates a restructured prompt using other methods. For example, the prompt restructuring system can perform the prompt restructuring and re-validation 330, as shown in FIG. 3, using other resources aside from the pseudocode 303. As an example, the prompt restructuring system can retrieve data for prompt restructuring from a user-based repository instead of from the pseudocode 303. Such a user-based repository can contain a wealth of information, including user preferences, historical data, and previously validated prompts, which can be leveraged to enhance the accuracy and relevance of the restructured prompt. By utilizing this repository, the prompt restructuring system can tailor the prompt restructuring process to better align with the specific needs and context of the user, thus improving the overall user experience. Additionally, the system can incorporate feedback mechanisms to continuously update and refine the repository, ensuring that the data remains current and reflective of the user's evolving requirements. In some implementations, alternative methods of restructuring the prompt or a combination of methods can be used.

Figure 5:
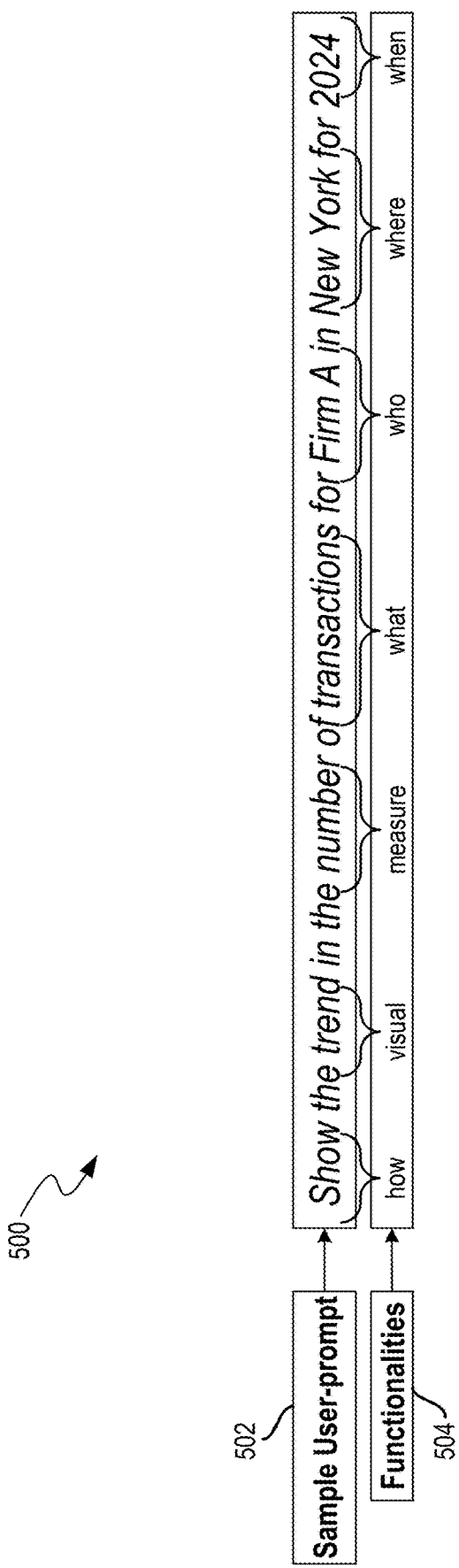
FIG. 5 is an example of a user prompt, in accordance with one or more implementations of this disclosure.

FIG. 5 is an example of a user prompt 500, in accordance with one or more implementations of this disclosure. As shown in FIG. 5, a sample user prompt 502 is "Show the trend in the number of transactions for Firm A in New York for 2024." The prompt restructuring system can break down this prompt by functionalities 504 into key parameters. For example, "Show" is a parameter indicating "how" to generate the prompt, "trend" is indicative of a visual output, "number" indicates a request for a measure, "transactions" is the parameter for which the user is requesting the measure, "Firm A" is the "who," "New York" indicates "where," and "2024" indicates "when," or the time period. The prompt restructuring system can use these key parameters and their functionalities 504 to reconstruct the prompt. As an example, query or code 410, as shown in FIG. 4, can include pseudocode, and the prompt restructuring system can utilize the query or code 410 in conjunction with the key parameters and functionalities to reconstruct the user prompts. For example, the prompt restructuring system can restructure the original prompt "Show the trend in the number of transactions for Firm A in New York for 2024," based on a determination that the match accuracy fails to satisfy the accuracy threshold. The pseudocode can include rules such as ensuring the inclusion of specific keywords, clarifying the time frame, or specifying the type of trend analysis required. Moreover, the prompt restructuring system can use the key parameters and functionalities, as discussed above, to reconstruct the prompt. Applying the rules, the system can generate a restructured prompt such as: "Display the monthly trend in the number of transactions for Firm A located in New York City for the year 2024." This restructured prompt is more precise and includes additional details, which can improve the match accuracy between the first and second outputs. By systematically applying pseudocode to the key parameters of the original user prompt, the prompt restructuring system can effectively address any discrepancies while maintaining the integrity of the original user prompt.

The prompt restructuring system can generate an updated first output by inputting the restructured prompt into the model. For example, as shown in FIG. 3, the prompt restructuring and re-validation 330 feeds into the model 304. This process involves using the restructured prompt to guide the model in producing a new set of outputs. The model can output an updated first output based on receiving the restructured prompt as input. The updated first output can include an updated first plurality of text-based analytics, an updated first plurality of visual analytics, and an updated first plurality of queries. Once the updated first output is generated, the system can perform an updated comparison between the updated first output and the second output (e.g., which was generated based on the pseudocode prompt) to determine an updated match accuracy. This comparison process can involve evaluating multiple dimensions of the outputs, as previously discussed. Specifically, the system can compare corresponding components between the updated first output and the second output. This can involve comparing the updated first plurality of text-based analytics with the second plurality of text-based analytics, comparing the updated first plurality of visual analytics with the second plurality of visual analytics, and comparing the updated first plurality of queries with the second plurality of queries. By conducting this multi-faceted comparison, the system can accurately assess the degree of alignment between the updated first outputs and the pseudocode outputs, thereby determining an updated match accuracy.

The prompt restructuring system can then determine whether the updated match accuracy satisfies a predefined accuracy threshold. The prompt restructuring system can use any of the techniques discussed above to assess the match accuracy. If the updated match accuracy meets or exceeds this threshold, it indicates that the restructured prompt has generated outputs that are consistent with the pseudocode outputs. Based on the updated match accuracy satisfying the accuracy threshold, the system can approve the restructured prompt. This approval signifies that the restructured prompt has been validated and is deemed effective in generating accurate and relevant outputs. By approving the restructured prompt, the system can signal that no further modifications or refinements are necessary, and the prompt can be used confidently for subsequent analyses or queries. In some implementations, the updated match accuracy does not satisfy the accuracy threshold. In this case, the prompt restructuring system can re-initiate the prompt restructuring process (e.g., prompt restructuring and re-validation 330, as shown in FIG. 3). The process can continue iteratively until a restructured version of the user prompt is approved based on a match accuracy that satisfies the accuracy threshold. The iterative process ensures that each restructured prompt is evaluated and refined until it accurately captures the user's intent and meets the predefined accuracy criteria, thereby enhancing the overall quality and relevance of the generated outputs.

Validation techniques relating to LLMs are described in U.S. patent application Ser. No. 18/907,414, filed Oct. 4, 2024, entitled "DYNAMIC INPUT-SENSITIVE VALIDATION OF MACHINE LEARNING MODEL OUTPUTS AND METHODS AND SYSTEMS OF THE SAME," and U.S. patent application Ser. No. 18/951,120, filed Nov. 18, 2024, entitled "DYNAMIC EVALUATION OF LANGUAGE MODEL PROMPTS FOR MODEL SELECTION AND OUTPUT VALIDATION AND METHODS AND SYSTEMS OF THE SAME," which are hereby incorporated by reference. For example, a system can evaluate an LLM output for accuracy, security, safety (e.g., with respect to associated policies, requirements, or criteria), compliance (e.g., compliance with regulations, rules, guidelines, etc.), and/or other requirements/recommendations. In response to validating the generated output, the system can transmit this information to an associated data store or deployment system (e.g., any relevant consumer of the generated data, such as a server that is accessible to the user). The system can use any of these techniques to validate or assess outputs from the model.

In some implementations, the prompt restructuring system utilizes multiple models to generate different categories of output, such as visual outputs, text-based outputs, and queries. This can cause a more specialized and efficient processing of user prompts. For instance, instead of relying on a single LLM to generate all types of outputs, the system can employ multiple distinct LLMs, such as one for visual data, one for text, and one for code or queries. Each LLM can be specialized for the respective type of outputs, improving the accuracy and quality of the generated outputs. When a prompt is received, the system can determine which LLM to direct the prompt to, based on the nature of the request. For example, a prompt requesting a visual representation of data can be routed to the LLM specialized in generating visual outputs, while a text-based analysis can be handled by the LLM specialized in generating text-based outputs, and a request involving database queries would go to the LLM specialized in generating code or queries. This targeted approach ensures that each prompt is processed by the most suitable model, optimizing the overall efficiency and effectiveness of the system. The system can handle these processes either in parallel or serially, depending on the complexity and requirements of the task at hand.

As the prompt restructuring process progresses, the prompt restructuring system can reroute the prompt to different specialized models as needed. For example, if the initial output from the text-based LLM requires further refinement involving visual data, the system can redirect the prompt to the visual LLM for additional processing. This dynamic re-routing capability allows the prompt restructuring system to adapt to the evolving needs of the prompt as it is restructured, ensuring that the final output meets the user's expectations. Moreover, the prompt restructuring system can take cost estimates into account, balancing the tradeoff between cost and accuracy. Users can have varying levels of tolerance for inaccuracies, and the prompt restructuring system can adjust its processing strategies accordingly. For example, a user requiring high precision is willing to incur higher costs for more accurate outputs, while another user can prioritize cost savings and accept a slightly lower level of accuracy. By incorporating these considerations into the prompt reconstruction process, the system can deliver tailored solutions that align with the user's specific needs and preferences and that optimize both performance and resource utilization.

Prompt routing techniques relating to LLMs are described in U.S. patent application Ser. No. 18/954,389, filed Nov. 20, 2024, entitled "DYNAMIC SYSTEM RESOURCE-SENSITIVE MODEL SOFTWARE AND HARDWARE SELECTION," which is a continuation of U.S. patent application Ser. No. 18/812,913, filed Aug. 22, 2024, entitled "DYNAMIC SYSTEM RESOURCE-SENSITIVE MODEL SOFTWARE AND HARDWARE SELECTION," both of which are hereby incorporated by reference. For example, a system can determine an attribute associated with the prompt (e.g., that the prompt is requesting the generation of a code sample) and reroute the prompt to a model that is configured to generate software-related outputs. By doing so, the system can recommend models that are well-suited to the user's requested task, thereby improving the utility of the disclosed data generation platform. The system can become more cost-effective by selecting models that more efficiently use resources and lower expenses.

Figure 6:
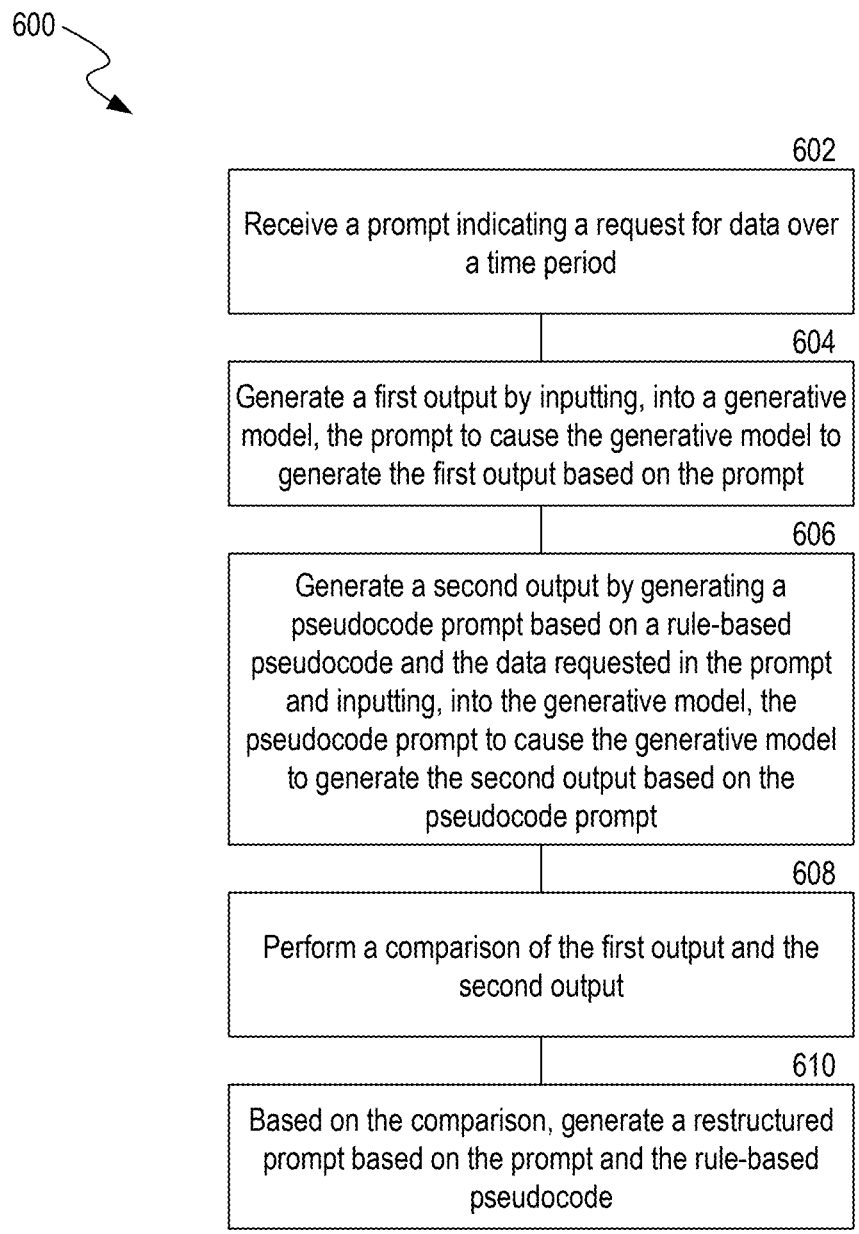
FIG. 6 is a flowchart of operations for improving accuracy of results from machine learning models, in accordance with one or more implementations of this disclosure.
Figure 8:
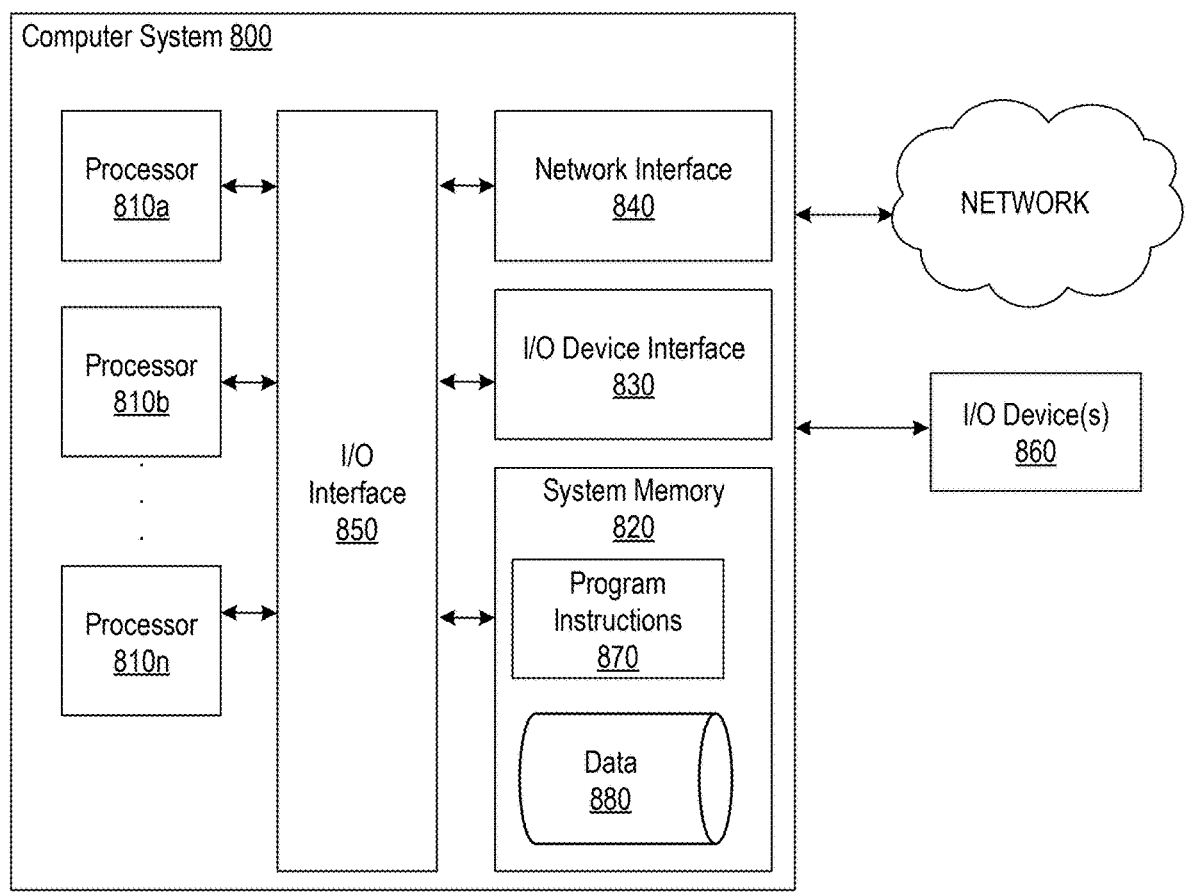
FIG. 8 illustrates an example computing system that can be used in accordance with some implementations of this disclosure.

FIG. 6 is a flowchart 600 of operations for improving accuracy of results from machine learning models, in accordance with one or more implementations of this disclosure. The operations of FIG. 6 can use components described in relation to FIG. 6. In some implementations, the prompt restructuring system 160 can include one or more components of computer system 800, as shown in FIG. 8.

At operation 602, the prompt restructuring system 160 (e.g., using one or more of processors 810a-810n) can receive a prompt indicating a request for data over a time period. For example, a user can input a prompt such as "Show the trend in the number of transactions for Firm A in New York for 2024." This prompt specifies the type of data requested (number of transactions), the entity of interest (Firm A), the location (New York), and the time period (2024). One or more of processors 810a-810n can receive the user prompt over the communication network 140 using network interface 840.

At operation 604, the prompt restructuring system 160 (e.g., using one or more of processors 810a-810n) can generate a first output. For example, this can involve inputting, into a model, the prompt to cause the model to generate the first output based on the prompt. For example, if the user prompt is "Show the trend in the number of transactions for Firm A in New York for 2024," the system can feed this prompt into the model. The output can include a narrative description of the transaction trends, statistical summaries, and visualizations such as graphs or charts. For instance, the model can produce a line graph showing the monthly transaction volumes for Firm A in New York throughout 2024, accompanied by a textual analysis highlighting any significant trends observed in the data. The model can also incorporate relevant contextual information to enhance the output. For example, it can include insights on external factors that could have influenced the transaction trends, such as economic conditions, regulatory changes, or significant events related to Firm A.

At operation 606, the prompt restructuring system 160 (e.g., using one or more of processors 810a-810n) can generate a second output. For example, this can involve generating a pseudocode prompt based on a rule-based pseudocode and the data requested in the prompt and inputting, into the model, the pseudocode prompt to cause the model to generate the second output based on the pseudocode prompt. This process involves translating the original user prompt into a structured and unambiguous pseudocode format that adheres to predefined rules and guidelines. By doing so, the system ensures that the model receives a clear and precise set of instructions, which can improve the accuracy and relevance of the second output as compared to the first output.

At operation 608, the prompt restructuring system 160 (e.g., using one or more of processors 810a-810n) can perform a comparison of the first output and the second output. This comparison process involves evaluating the similarity between the outputs generated from the original user prompt and the refined pseudocode prompt. The comparison can involve assessing whether a match accuracy between the first and second outputs satisfies a predefined accuracy threshold. This threshold represents the minimum level of agreement required between the two outputs to consider the model's response based on the user prompt to be reliable and accurate. If the match accuracy meets or exceeds the threshold, it indicates that the user prompt has successfully guided the model to produce a consistent and accurate output. Conversely, if the match accuracy falls below the threshold, refinement of the prompt is necessary to achieve the desired level of accuracy.

At operation 610, the prompt restructuring system 160 (e.g., using one or more of processors 810a-810n) can, based on the comparison, generate a restructured prompt based on the prompt and the rule-based pseudocode. This can involve transforming the original user prompt into a more structured and precise format, using the pseudocode, which adheres to predefined rules and guidelines. This process can involve breaking down the initial prompt into its essential components and reassembling them in a logical sequence that eliminates ambiguities and enhances clarity. By specifying explicit instructions, defining clear parameters, and incorporating necessary context, the pseudocode format ensures that the model receives a well-defined set of instructions.

Figure 7:
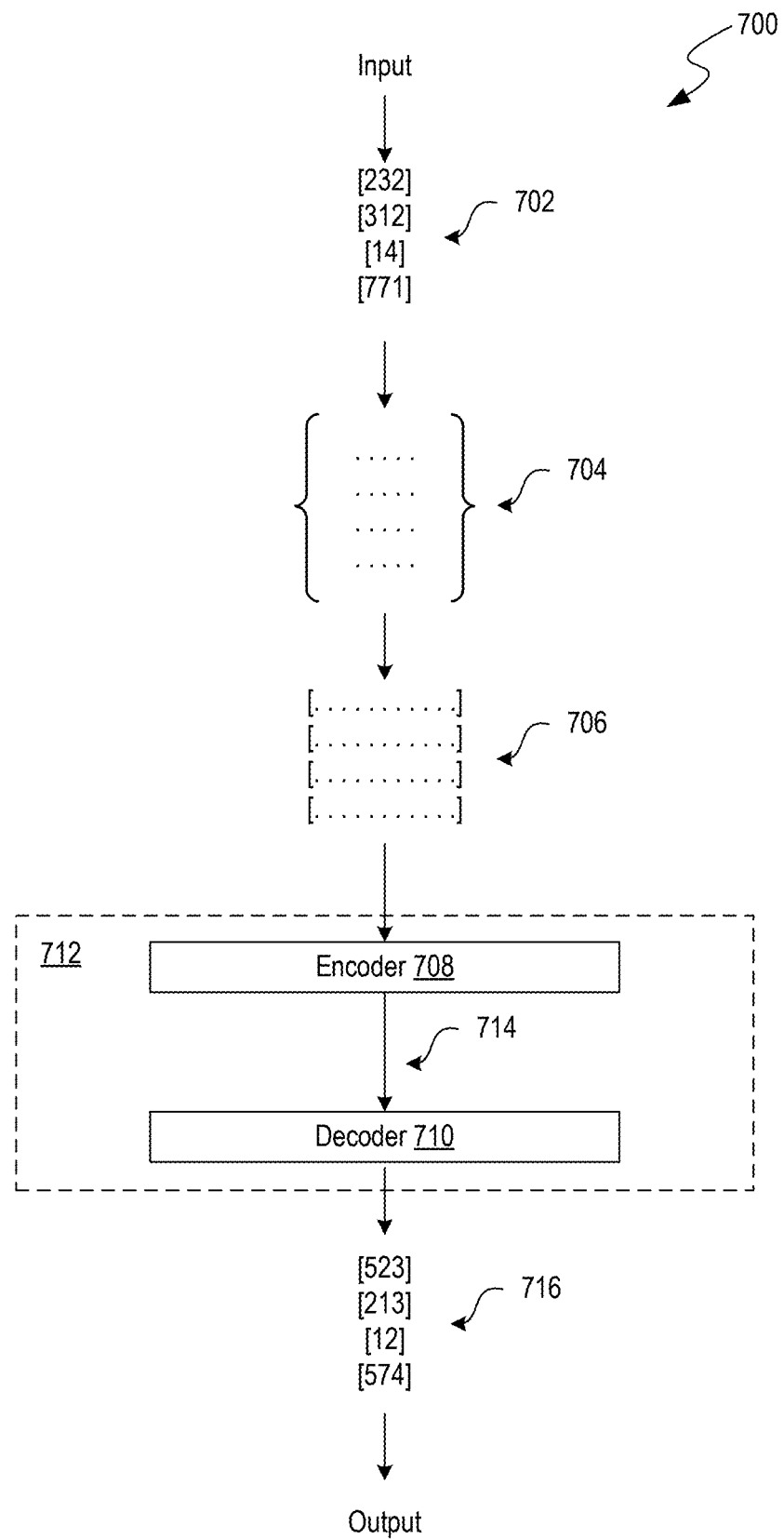
FIG. 7 is a block diagram of an example transformer used to improve accuracy of results from machine learning models, in accordance with one or more implementations of this disclosure.

FIG. 7 is a block diagram 700 of an example transformer 712 used to improve accuracy of results from models, in accordance with one or more implementations of this disclosure. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure can be applicable to any machine learning-based language model, including language models based on other neural network architectures, such as RNN-based language models.

The transformer 712 includes an encoder 708 (which can include one or more encoder layers/blocks connected in series) and a decoder 710 (which can include one or more decoder layers/blocks connected in series). Generally, the encoder 708 and the decoder 710 each include multiple neural network layers, at least one of which can be a self-attention layer. The parameters of the neural network layers can be referred to as the parameters of the language model.

The transformer 712 can be trained to perform certain functions on a natural language input. Examples of the functions include summarizing existing content, brainstorming ideas, writing a rough draft, fixing spelling and grammar, and translating content. Summarizing can include extracting key points or themes from existing content in a high-level summary. Brainstorming ideas can include generating a list of ideas based on provided input. For example, the machine learning model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 712 is trained to perform certain functions on input formats other than natural language input. For example, the input can include objects, images, audio content, or video content, or a combination thereof.

The transformer 712 can be trained on a text corpus that is labeled (e.g., annotated to indicate verbs, nouns) or unlabeled. LLMs can be trained on a large unlabeled corpus. The term "language model," as used herein, can include a machine learning-based language model (e.g., a language model that is implemented using a neural network or other machine learning architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 7 illustrates an example block diagram 700 of how the transformer 712 can process textual input data. Input to a language model (whether transformer-based or otherwise) typically is in the form of natural language that can be parsed into tokens. The term "token" in the context of language models and NLP has a different meaning from the use of the same term in other contexts, such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list or a paragraph), an [EOT] token can be another special token that indicates the end of the textual sequence, other tokens can provide formatting information, etc.

As shown in the example block diagram 700, a short sequence of tokens 702 corresponding to the input text is illustrated as input to the transformer 712. Tokenization of the text sequence into the tokens 702 can be performed by some pre-processing tokenization module such as, for example, a byte-pair encoding tokenizer (the "pre" referring to the tokenization occurring prior to the processing of the tokenized input by the LLM), which is not shown in FIG. 6 for brevity. In general, the token sequence that is inputted to the transformer 712 can be of any length up to a maximum length defined based on the dimensions of the transformer 712. Each token 702 in the token sequence is converted into an embedding 706 (also referred to as "embedding vector").

An embedding 706 is a learned numerical representation (such as, for example, a vector) of a token that captures some semantic meaning of the text segment represented by the token 702. The embedding 706 represents the text segment corresponding to the token 702 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 706 corresponding to the "write" token will be closer to another embedding corresponding to the "jot down" token in the vector space as compared to the distance between the embedding 706 corresponding to the "write" token and another embedding corresponding to the "summary" token.

The vector space can be defined by the dimensions and values of the embedding vectors. Various techniques can be used to convert a token 702 to an embedding 706. For example, another trained machine learning model can be used to convert the token 702 into an embedding 706. In particular, another trained machine learning model can be used to convert the token 702 into an embedding 706 in a way that encodes additional information into the embedding 706 (e.g., a trained machine learning model can encode positional information about the position of the token 702 in the text sequence into the embedding 706). In some implementations, the numerical value of the token 702 can be used to look up the corresponding embedding in an embedding matrix 704, which can be learned during training of the transformer 712.

The generated embeddings, e.g., such as the embedding 706, are input into the encoder 708. The encoder 708 serves to encode the embedding 706 into feature vectors 714 that represent the latent features of the embedding 706. The encoder 708 can encode positional information (i.e., information about the sequence of the input) in the feature vectors 714. The feature vectors 714 can have very high dimensionality (e.g., on the order of thousands or tens of thousands), with each element in a feature vector corresponding to a respective feature. The numerical weight of each element in a feature vector represents the importance of the corresponding feature. The space of all possible feature vectors, e.g., such as the feature vectors 714, that can be generated by the encoder 708 can be referred to as a latent space or feature space.

Conceptually, the decoder 710 is designed to map the features represented by the feature vectors 714 into meaningful output, which can depend on the task that was assigned to the transformer 712. For example, if the transformer 712 is used for a translation task, the decoder 710 can map the feature vectors 714 into text output in a target language different from the language of the original tokens 702. Generally, in a generative language model, the decoder 710 serves to decode the feature vectors 714 into a sequence of tokens. The decoder 710 can generate output tokens 716 one by one. Each output token 716 can be fed back as input to the decoder 710 in order to generate the next output token 716. By feeding back the generated output and applying self-attention, the decoder 710 can generate a sequence of output tokens 716 that has sequential meaning (e.g., the resulting output text sequence is understandable as a sentence and obeys grammatical rules). The decoder 710 can generate output tokens 716 until a special [EOT] token (indicating the end of the text) is generated. The resulting sequence of output tokens 716 can then be converted to a text sequence in post-processing. For example, each output token 716 can be an integer number that corresponds to a vocabulary index. By looking up the text segment using the vocabulary index, the text segment corresponding to each output token 716 can be retrieved, the text segments can be concatenated together, and the final output text sequence can be obtained.

In some implementations, the input provided to the transformer 712 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLM s. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,047 input tokens), and is able to generate a large number of tokens as output (e.g., up to 2,047 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive or can involve a large number of operations (e.g., many instructions can be executed/large data structures can be accessed from memory), and providing output in a required timeframe (e.g., real time or near real time) can require the use of a plurality of processors/cooperating computing devices as discussed above.

Input(s) to an LLM can be referred to as a prompt, which is a natural language input that includes instructions to the LL M to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

The above-described implementations of the present disclosure are presented for purposes of illustration, not of limitation, and the present disclosure is limited only by the claims which follow. Furthermore, it should be noted that the features and limitations described in any one implementation can be applied to any other implementation herein, and flowcharts or examples relating to one implementation can be combined with any other implementation in a suitable manner, done in different orders, or done in parallel. In addition, the systems and methods described herein can be performed in real time. It should also be noted that the systems or methods described above can be applied to, or used in accordance with, other systems or methods.

FIG. 8 shows an example computing system that can be used in accordance with some implementations of this disclosure. In some instances, computing system 800 is referred to as a computer system 800. A person skilled in the art would understand that those terms can be used interchangeably. The components of FIG. 8 can be used to perform some or all operations discussed in relation to FIGS. 1-7. Furthermore, various portions of the systems and methods described herein can include or be executed on one or more computer systems similar to computing system 800. Further, processes and modules described herein can be executed by one or more processing systems similar to that of computing system 800.

Computing system 800 can include one or more processors (e.g., processors 810*a*-810*n*) coupled to system memory 820, an input/output (I/O) device interface 830, and a network interface 840 via an I/O interface 850. A processor can include a single processor or a plurality of processors (e.g., distributed processors). A processor can be any suitable processor capable of executing or otherwise performing instructions. A processor can include a central processing unit (CPU) that carries out program instructions to perform the arithmetical, logical, and I/O operations of computing system 800. A processor can execute code (e.g., processor firmware, a protocol stack, a database management system, an operating system, or a combination thereof) that creates an execution environment for program instructions.

A processor can include a programmable processor. A processor can include general or special purpose microprocessors. A processor can receive instructions and data from a memory (e.g., system memory 820). Computing system 800 can be a uni-processor system including one processor (e.g., processor 810*a*), or a multiprocessor system including any number of suitable processors (e.g., 810*a*-810*n*). Multiple processors can be employed to provide for parallel or sequential execution of one or more portions of the techniques described herein. Processes, such as logic flows, described herein can be performed by one or more programmable processors executing one or more computer programs to perform functions by operating on input data and generating corresponding output. Processes described herein can be performed by, and apparatus can also be implemented as, special purpose logic circuitry, e.g., an FPGA (field-programmable gate array) or an A SIC (application-specific integrated circuit). Computing system 800 can include a plurality of computing devices (e.g., distributed computer systems) to implement various processing functions.

I/O device interface 830 can provide an interface for connection of one or more I/O devices 860 to computer system 800. I/O devices can include devices that receive input (e.g., from a user) or output information (e.g., to a user). I/O devices 860 can include, for example, a graphical UI presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 can be connected to computer system 800 through a wired or wireless connection. I/O devices 860 can be connected to computer system 800 from a remote location. I/O devices 860 located on remote computer systems, for example, can be connected to computer system 800 via a network and network interface 840.

The I/O device interface 830 and I/O devices 860 can be used to enable manipulation of the three-dimensional model as well. For example, the user can be able to use I/O devices such as a keyboard and touchpad to indicate specific selections for nodes, adjust values for nodes, select from the history of machine learning models, select specific inputs or outputs, or the like. Alternatively or additionally, the user can use their voice to indicate specific nodes, specific models, or the like via the voice recognition device or microphones.

Network interface 840 can include a network adapter that provides for connection of computer system 800 to a network. Network interface 840 can facilitate data exchange between computer system 800 and other devices connected to the network. Network interface 840 can support wired or wireless communication. The network can include an electronic communication network, such as the internet, a LAN, a WAN, a cellular communications network, or the like.

System memory 820 can be configured to store program instructions 870 or data 880. Program instructions 870 can be executable by a processor (e.g., one or more of processors 810a-810n) to implement one or more implementations of the present techniques. Program instructions 870 can include modules of computer program instructions for implementing one or more techniques described herein with regard to various processing modules. Program instructions can include a computer program (which in certain forms is known as a program, software, software application, script, or code). A computer program can be written in a programming language, including compiled or interpreted languages, or declarative or procedural languages. A computer program can include a unit suitable for use in a computing environment, including as a stand-alone program, a module, a component, or a subroutine. A computer program can correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one or more computer processors located locally at one site or distributed across multiple remote sites and interconnected by a communication network.

System memory 820 can include a tangible program carrier having program instructions stored thereon. A tangible program carrier can include a non-transitory, computer-readable storage medium. A non-transitory, computer-readable storage medium can include a machine-readable storage device, a machine-readable storage substrate, a memory device, or any combination thereof. A non-transitory, computer-readable storage medium can include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 820 can include a non-transitory, computer-readable storage medium that can have program instructions stored thereon that are executable by a computer processor (e.g., one or more of processors 810a-810n) to cause the subject matter and the functional operations described herein. A memory (e.g., system memory 820) can include a single memory device or a plurality of memory devices (e.g., distributed memory devices).

I/O interface 850 can be configured to coordinate I/O traffic between processors 810a-810n, system memory 820, network interface 840, I/O devices 860, or other peripheral devices. I/O interface 850 can perform protocol, timing, or other data transformations to convert data signals from one component (e.g., system memory 820) into a format suitable for use by another component (e.g., processors 810a-810n). I/O interface 850 can include support for devices attached through various types of peripheral buses, such as a variant of the Peripheral Component Interconnect (PCI) bus standard or the Universal Serial Bus (USB) standard.

Implementations of the techniques described herein can be implemented using a single instance of computer system 800 or multiple computer systems 800 configured to host different portions or instances of implementations. Multiple computer systems 800 can provide for parallel or sequential processing/execution of one or more portions of the techniques described herein.

Those skilled in the art will appreciate that computer system 800 is merely illustrative and is not intended to limit the scope of the techniques described herein. Computer system 800 can include any combination of devices or software that can perform or otherwise provide for the performance of the techniques described herein. For example, computer system 800 can include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 800 can also be connected to other devices that are not illustrated or can operate as a stand-alone system. In addition, the functionality provided by the illustrated components may, in some implementations, be combined in fewer components, or be distributed in additional components. Similarly, in some implementations, the functionality of some of the illustrated components may not be provided, or other additional functionality can be available.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples of the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology not only can include additional elements to those implementations noted above, but also can include fewer elements.

These and other changes can be made to the technology in light of the above Detailed Description. While the above description describes certain examples of the technology and describes the best mode contemplated, no matter how detailed the above appears in text, the technology can be practiced in many ways. Details of the system can vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, either in this application or in a continuing application.

We claim:

1. One or more non-transitory, computer-readable storage media comprising instructions recorded thereon, wherein the instructions, when executed by at least one data processor of a system, cause the system to:
   receive a user prompt indicating a request for a report summarizing data over a time period;
   generate a first output by inputting, into a generative model, the user prompt to cause the generative model to generate the first output based on the user prompt, the first output comprising a first plurality of text-based analytics, a first plurality of visual analytics, and a first plurality of queries;
   generate a second output by causing the system to:
      retrieve, from a database associated with the data requested in the user prompt, a rule-based pseudocode;
      generate a pseudocode prompt based on the rule-based pseudocode and the data requested in the user prompt; and
      input, into the generative model, the pseudocode prompt to cause the generative model to generate the second output based on the pseudocode prompt, the second output comprising a second plurality of text-based analytics, a second plurality of visual analytics, and a second plurality of queries;
   perform a comparison between (i) the first plurality of text-based analytics and the second plurality of text-based analytics, (ii) the first plurality of visual analytics and the second plurality of visual analytics, and (iii) the first plurality of queries and the second plurality of queries, to determine a match accuracy between the first output and the second output;
   determine whether the match accuracy satisfies an accuracy threshold;
   based on the match accuracy failing to satisfy the accuracy threshold, generate a restructured prompt based on the user prompt and the rule-based pseudocode; and
   approve the restructured prompt for use in conjunction with the generative model.

2. The one or more non-transitory, computer-readable storage media of claim 1, wherein, to approve the restructured prompt, the instructions further cause the system to:
   generate an updated first output by inputting, into the generative model, the restructured prompt to cause the generative model to generate the updated first output based on the restructured prompt, the updated first output comprising an updated first plurality of text-based analytics, an updated first plurality of visual analytics, and an updated first plurality of queries;
   perform an updated comparison of the updated first output and the second output to determine an updated match accuracy;
   determine whether the updated match accuracy satisfies the accuracy threshold; and
   based on the updated match accuracy satisfying the accuracy threshold, approve the restructured prompt.

3. The one or more non-transitory, computer-readable storage media of claim 2, wherein performing the updated comparison comprises causing the system to compare (i) the updated first plurality of text-based analytics with the second plurality of text-based analytics, (ii) the updated first plurality of visual analytics with the second plurality of visual analytics, and (iii) the updated first plurality of queries with the second plurality of queries.

4. The one or more non-transitory, computer-readable storage media of claim 1, wherein performing the comparison comprises causing the system to determine a measure of similarity between (i) the first plurality of text-based analytics and the second plurality of text-based analytics, (ii) the first plurality of visual analytics and the second plurality of visual analytics, and (iii) the first plurality of queries and the second plurality of queries.

5. The one or more non-transitory, computer-readable storage media of claim 1, wherein the instructions further cause the system to:
  determine a ranking of categories of the first output and the second output according to a measure of importance of each category, the categories comprising text-based analytics, visual analytics, and queries,
    wherein the comparison is performed according to the ranking.

6. The one or more non-transitory, computer-readable storage media of claim 5, wherein, to perform the comparison according to the ranking, the instructions further cause the system to:
  compare a higher-ranked category between the first output and the second output, wherein the categories of the first output and the second output comprise at least a higher-ranked category and a lower-ranked category;
  based on determining that the higher-ranked category fails to match between the first output and the second output, generate the restructured prompt; and
  based on determining that the higher-ranked category matches between the first output and the second output, approve the user prompt.

7. A method comprising:
  receiving a user prompt indicating a request for data over a time period;
  generating a first output by inputting, into a generative model, the user prompt to cause the generative model to generate the first output based on the user prompt, the first output comprising a first plurality of text-based analytics, a first plurality of visual analytics, and a first plurality of queries;
  generating a second output by:
    retrieving, from a database associated with the data requested in the user prompt, a structured pseudocode;
    generating a pseudocode prompt based on the structured pseudocode and the data requested in the user prompt; and
    inputting, into the generative model, the pseudocode prompt to cause the generative model to generate the second output based on the pseudocode prompt, the second output comprising a second plurality of text-based analytics, a second plurality of visual analytics, and a second plurality of queries;
  performing a comparison of the first output and the second output; and
  based on the comparison indicating that the first output does not match the second output, generating a restructured prompt based on the user prompt and the structured pseudocode.

8. The method of claim 7, wherein performing the comparison further comprises:
  determining, based on the comparison, a match accuracy between the first output and the second output; and
  determining whether the match accuracy satisfies an accuracy threshold,
    wherein the restructured prompt is generated based on the comparison indicating that the match accuracy does not satisfy the accuracy threshold.

9. The method of claim 8, further comprising:
  generating an updated first output by inputting, into the generative model, the restructured prompt to cause the generative model to generate the updated first output based on the restructured prompt, the updated first output comprising an updated first plurality of text-based analytics, an updated first plurality of visual analytics, and an updated first plurality of queries;
  performing an updated comparison of the updated first output and the second output to determine an updated match accuracy;
  determining whether the updated match accuracy satisfies the accuracy threshold; and
  based on the updated match accuracy satisfying the accuracy threshold, approving the restructured prompt.

10. The method of claim 9, wherein performing the updated comparison comprises comparing (i) the updated first plurality of text-based analytics with the second plurality of text-based analytics, (ii) the updated first plurality of visual analytics with the second plurality of visual analytics, and (iii) the updated first plurality of queries with the second plurality of queries.

11. The method of claim 7, wherein performing the comparison comprises comparing (i) the first plurality of text-based analytics with the second plurality of text-based analytics, (ii) the first plurality of visual analytics with the second plurality of visual analytics, and (iii) the first plurality of queries with the second plurality of queries.

12. The method of claim 7, further comprising:
  determining a ranking of categories of the first output and the second output according to a measure of importance of each category, the categories comprising text-based analytics, visual analytics, and queries,
    wherein the comparison is performed according to the ranking.

13. The method of claim 12, wherein performing the comparison according to the ranking comprises:
  comparing a higher-ranked category between the first output and the second output, wherein the categories of the first output and the second output comprise at least a higher-ranked category and a lower-ranked category;
  based on determining that the higher-ranked category fails to match between the first output and the second output, generating the restructured prompt; and
  based on determining that the higher-ranked category matches between the first output and the second output, approving the user prompt.

14. A system comprising:
  a storage device; and
  one or more processors communicatively coupled to the storage device storing instructions thereon that cause the one or more processors to:
  receive a prompt indicating a request for data over a time period;
  generate a first output by inputting, into a machine learning model, the prompt to cause the machine learning model to generate the first output based on the prompt;
  generate a second output by causing the one or more processors to:
    generate a pseudocode prompt based on a structured pseudocode and the data requested in the prompt; and input, into the machine learning model, the pseudocode prompt to cause the machine learning model to generate the second output based on the pseudocode prompt;

perform a comparison of the first output and the second output; and based on the comparison, generate a restructured prompt based on the prompt and the structured pseudocode.

15. The system of claim 14, wherein, to perform the comparison, the instructions further cause the one or more processors to:

determine, based on the comparison, a match accuracy between the first output and the second output; and determine whether the match accuracy satisfies an accuracy threshold, wherein the restructured prompt is generated based on the comparison indicating that the match accuracy does not satisfy the accuracy threshold.

16. The system of claim 15, wherein the instructions further cause the one or more processors to:

generate an updated first output by inputting, into the machine learning model, the restructured prompt to cause the machine learning model to generate the updated first output based on the restructured prompt, the updated first output comprising an updated first plurality of text-based analytics, an updated first plurality of visual analytics, and an updated first plurality of queries;

perform an updated comparison of the updated first output and the second output to determine an updated match accuracy;

determine whether the updated match accuracy satisfies the accuracy threshold; and based on the updated match accuracy satisfying the accuracy threshold, approve the restructured prompt.

17. The system of claim 16, wherein the second output comprises a second plurality of text-based analytics, a second plurality of visual analytics, and a second plurality of queries, and wherein performing the updated comparison comprises causing the one or more processors to compare (i) the updated first plurality of text-based analytics with the second plurality of text-based analytics, (ii) the updated first plurality of visual analytics with the second plurality of visual analytics, and (iii) the updated first plurality of queries with the second plurality of queries.

18. The system of claim 14, wherein the first output comprises a first plurality of text-based analytics, a first plurality of visual analytics, and a first plurality of queries, wherein the second output comprises a second plurality of text-based analytics, a second plurality of visual analytics, and a second plurality of queries, and wherein performing the comparison comprises causing the one or more processors to compare (i) the first plurality of text-based analytics with the second plurality of text-based analytics, (ii) the first plurality of visual analytics with the second plurality of visual analytics, and (iii) the first plurality of queries with the second plurality of queries.

19. The system of claim 14, wherein the instructions further cause the one or more processors to:

determine a ranking of categories of the first output and the second output according to a measure of importance of each category, the categories comprising text-based analytics, visual analytics, and queries, wherein the comparison is performed according to the ranking.

20. The system of claim 19, wherein, to perform the comparison according to the ranking, the instructions further cause the one or more processors to:

compare a higher-ranked category between the first output and the second output, wherein the categories of the first output and the second output comprise at least a higher-ranked category and a lower-ranked category;

based on determining that the higher-ranked category fails to match between the first output and the second output, generate the restructured prompt; and based on determining that the higher-ranked category matches between the first output and the second output, approve the prompt.

\* \* \* \* \*